(12) United States Patent
Berneth et al.

(10) Patent No.: US 6,404,532 B1
(45) Date of Patent: Jun. 11, 2002

(54) ELECTROCHROMIC SYSTEM

(75) Inventors: Horst Berneth, Leverkusen;
Helmut-Werner Heuer, Krefeld, both of (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/530,216

(22) PCT Filed: Oct. 22, 1998

(86) PCT No.: PCT/EP98/06721
§ 371 (c)(1),
(2), (4) Date: Apr. 26, 2000

(87) PCT Pub. No.: WO99/23528
PCT Pub. Date: May 14, 1999

(30) Foreign Application Priority Data

Nov. 3, 1997  (DE) .......................................... 197 48 358

(51) Int. Cl.[7] .............................. G02F 1/15; G02F 1/153
(52) U.S. Cl. ....................... 359/265; 359/273; 359/274; 359/275; 252/583
(58) Field of Search ................................ 359/274, 265, 359/267, 272, 273, 275, 839; 252/582, 583, 600; 544/347; 546/257; 204/290.07; 428/426, 427

(56) References Cited

U.S. PATENT DOCUMENTS

| | | | |
|---|---|---|---|
| 3,280,701 A | 10/1966 | Donnelly et al. ........... | 359/267 |
| 4,227,779 A | * 10/1980 | Bissar et al. ................. | 359/274 |
| 4,902,108 A | 2/1990 | Byker ......................... | 359/265 |
| 5,151,816 A | 9/1992 | Varaprasad et al. ......... | 359/275 |
| 5,611,966 A | * 3/1997 | Varaprasad et al. ......... | 252/583 |

OTHER PUBLICATIONS

Topics in Current Chemistry, vol. 92, pp. 1–44, (month unavailable) 1980, Hünig et al, "Two Step Reversible Redox Systems of the Weitz Type".
Ullmann's Ency. of Org. Chem, VCH Verlag MbH, 5th ed., vol. 9, (month unavailable) 1987, pp. 547–563, Muskopf et al, "Epoxy Resins".
Ullmann's Ency. der tech. Chemie, VCH Verlagsgisallschaft MbH, 4th ed., vol. 14, pp. 227–268, (month unavailable) 1977, Dierichs et al "Klebstoffe und Dichtungsmassen".
Applied Polymer Science, 2nd ed, ACS Symposium Series 285, ACS Washington (month unavailable) 1985, pp. 931–961, R. S. Bauer, "Epoxy Resins".

* cited by examiner

Primary Examiner—Loha Ben
(74) Attorney, Agent, or Firm—Joseph C. Gil; Richard E. L. Henderson

(57) ABSTRACT

The invention relates to an electrochromic device comprising a pair of transparently and conductively coated glass or plastic plates, one of which is optionally mirrored and the conductive layer of one or both of which is optionally subdivided into separate individually electrically contacted segments, wherein
(1) the plates are joined together on the sides of their conductive coating by an adhesive bead into which spacers are optionally embedded, wherein the adhesive used for the adhesive bead is a thermally or photochemically curing epoxy adhesive or an epoxy adhesive that cures thermally after photochemical initiation,
(2) the volume formed by the two plates and the adhesive bead is filled with an electrochromic fluid through one or more apertures, and
(3) the filling aperture or apertures required for introduction of the electrochromic fluid are sealed with an adhesive after filling has taken place, wherein the adhesive used for sealing is a photochemically curing acrylate adhesive or an epoxy adhesive that cures photochemically or following photochemical initiation at room temperature.

14 Claims, 2 Drawing Sheets

ELECTROCHROMIC SYSTEM

BACKGROUND OF THE INVENTION

The invention relates to an electrochromic device and to its production.

Electrochromic devices comprising an electrochromic system are already known.

The electrochromic system of such devices commonly includes pairs of redox substances—redox couples—dissolved in an inert solvent. Conductive salts, light stabilizers and substances which influence the viscosity may additionally be present.

The redox couple used comprises one reducible and one oxidizable substance each. Both are colourless or have only a weak colouration. Under the influence of an electrical voltage, one substance is reduced and the other oxidized, with at least one becoming coloured in the process. After the voltage is switched off, the two original redox substances are formed once more, which is accompanied by the disappearance or fading of the colour.

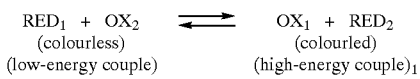

$$RED_1 + OX_2 \rightleftharpoons OX_1 + RED_2$$
(colourless) (colourled)
(low-energy couple) (high-energy couple)$_1$ U.S. Pat. No. 4,902,108 discloses that suitable such redox couples are those where the reducible substance has at least two chemically reversible reduction waves in the cyclic voltammogram and the oxidizable substance, correspondingly, has at least two chemically reversible oxidation waves.

Electrochromic devices can find multivarious applications. For example, they may take the form of a rearview car mirror which when travelling at night can be darkened by applying a voltage, thus preventing the driver being dazzled by headlights of other vehicles (cf. e.g. U.S. Pat. No. 3,280,701, U.S. Pat. No. 4,902,108, EP-A 0 435 689). Devices of this type may also be employed in window panes or car sun roofs where, following application of a voltage, they provide shade from the sunlight. Finally, it is possible to use such devices to construct a display device for the graphic representation of information in the form of letters, numbers and symbols, for instance.

Electrochromic devices normally consist of a pair of glass or plastic plates, one being mirrored in the case of a car mirror. One side of these plates is coated with a transparent, electroconductive layer, e.g. indium tin oxide (ITO). These plates are then used to construct a cell: to this end their facing, electroconductively coated side is attached, preferably by means of adhesive bonding, to an annular or rectangular sealing ring. The sealing ring establishes a uniform distance between the plates of, for example, from 0.01 to 0.5 mm. This cell is then filled via an aperture with an electrochromic solution and the cell is tightly sealed. By way of the ITO layer it is possible to contact the two plates separately.

The electrochromic systems known from the prior art comprise redox couples which following the reduction and oxidation, respectively, form coloured free radicals, cationic free radicals or anionic free radicals that are chemically reactive. As known, for example, from Topics in Current Chemistry, Vol. 92, pp. 1–44 (1980) such (ionic) free radicals may be sensitive to electrophiles or nucleophiles or else to free radicals. In order, therefore, to achieve a high level of stability in an electrochromic device comprising an electrochromic system of this kind—a system which is intended to withstand several thousand switching cycles—it is necessary to ensure that the solvent used is absolutely free from electrophiles, e.g. protons, nucleophiles and oxygen. It must also be ensured that such reactive species are not formed by electrochemical processes taking place at the electrodes during operation of the electrochromic device.

Suitable solvents are known from the patents cited above.

In addition, however, the sealing and closure material of the electrochromic cell must be such that it does not comprise, give off or form in contact with the electrochromic system any reactive constituents which react with the electrochromic substances or with the species formed electrochemically from them, such as the abovementioned free-radical or ionic free-radical species or with the double-reduced or double-oxidized species which are always present in equilibrium or are formed electrochemically.

The back-reaction to $RED_1$ and $OX_2$ that is formulated in the above equation also takes place continuously away from the electrodes within the volume of the solution while the electrochromic device is in operation. Owing to the above-described hazards of degradation reactions of the (ionic) free radicals by electrophiles, nucleophiles or free radicals it is important, for the long-term stability of the display, that the back-reaction in accordance with the above equation is able to take place as rapidly as possible and without side reactions.

It has now been found that by coupling $RED_1$ and $OX_2$ via a covalent chemical bond, electron transfer is facilitated and hence the back-reaction in accordance with the above equation can be accelerated and side reactions avoided.

Other findings have been suitable adhesives, which can be used as a seal and as a closure of the electrochromic device after it has been filled, and appropriate curing conditions for these adhesives, so that none of the hazardous side reactions described above occur.

SUMMARY OF THE INVENTION

The present invention accordingly provides an electrochromic device comprising a pair of transparently and conductively coated glass or plastic plates, of which one may be mirrored and of which the conductive layer of one of the two plates or else of both can be subdivided into separate, individually electrically contacted segments which are joined together on the sides of their conductive coating by an adhesive bead into which spacers may be embedded, and where the volume formed from the two plates and the adhesive bead is filled with an electrochromic fluid and where the filling aperture or apertures required for introduction of the electrochromic fluid is or are sealed with an adhesive after filling has taken place, characterized in that a thermally or photochemically curing epoxy adhesive, or an epoxy adhesive which cures thermally after photochemical initiation, is used for the adhesive bead for constructing the electrochromic device and in that a photochemically curing acrylate adhesive or an epoxy adhesive which cures photochemically or following photochemical initiation at room temperature is used for sealing.

DETAILED DESCRIPTION OF THE INVENTION

Figure 1:
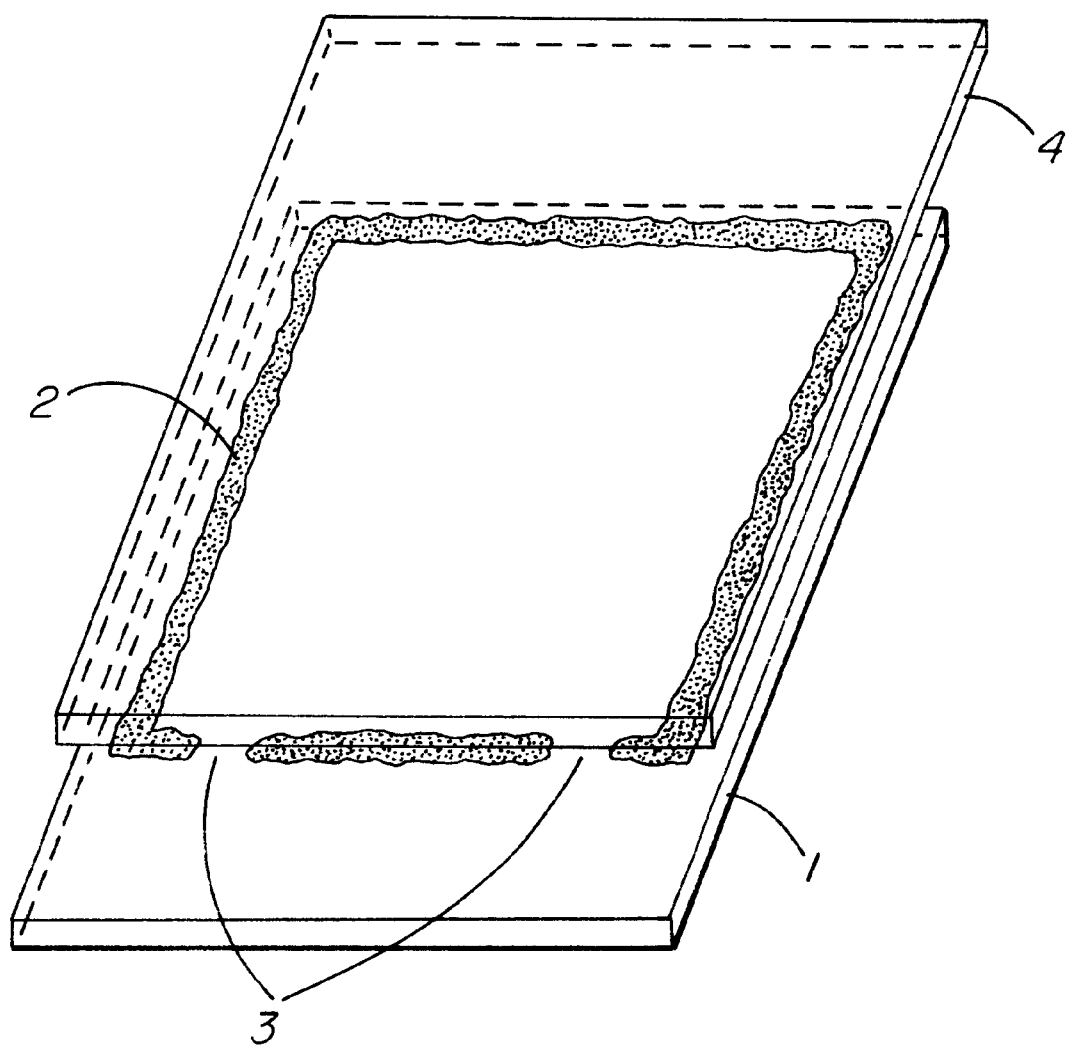
FIG. 1 represents an embodiment of the invention in which two glass plates are separated by a spacing material having filling apertures through which an electrochromic liquid can be introduced.

Epoxy adhesives are known, for example, from J. W. Muskopf, S. B. McCollister in Ullmann's Encyclopedia of Organic Chemistry, VCH Verlagsgesellschaft mbH, 5th edition, Vol. A 9, p. 547 ff., 1987. Curing may take place by an anionic or cationic mechanism.

Acrylate adhesives are known, for example, from W. Dierichs et al. in Ullmanns Encyklopädie der technischen Chemie, VCH Verlagsgesellschaft mbH, 4th edition, Volume 14, p. 233 ff., 1977. Curing takes place by a free-radical mechanism, which may be initiated by means of ultraviolet radiation with the aid of added photoinitiators.

The epoxy adhesive according to the invention for the adhesive bead which holds the two transparent plates together at the desired distance is a two-component (two-pack) or one-component adhesive. It is preferably a two-component epoxy adhesive, where, for example, one component comprises an epoxide compound and the other component comprises an aminic, anhydride or Lewis acid or Lewis base compound, or a one-component epoxy adhesive which comprises, for example, an epoxide compound and a capped Lewis or Brønsted acid or Lewis or Brønsted base compound which on exposure to heat or light releases a Lewis or Brønsted acid or Lewis or Brønsted base compound.

With particular preference, the epoxide component comprises an epoxide of the formula

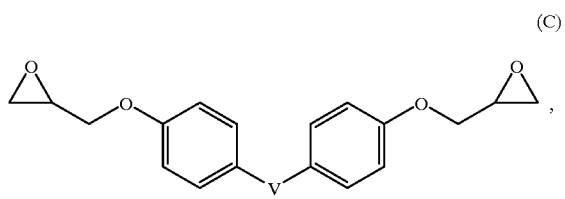

(C)

in which
V represents a bridge, which may likewise carry epoxy groups, and the aminic component is a primary or secondary aliphatic, cycloaliphatic, aromatic, araliphatic or heterocyclic, at least bifunctional amine and the Lewis acid compound, which is in capped form, is a non-metal halide and the Brønsted acid compound, which is in capped form, is a strong protic acid which is derived from non-metal halides.

Examples of such non-metal halides are boron trifluoride, boron trichloride, phosphorus pentafluoride, arsenic pentafluoride, arsenic pentachloride, antimony pentafluoride and antimony pentachloride. The protic acids derived therefrom are then for example $HBF_4$, $HBCl_4$, $HPF_6$, $HAsF_6$, $HAsCl_6$, $HSbF_6$, $HSbCl_6$. Examples of capped non-metal halides are adducts of amines with these non-metal halides, examples being $BF_3.NH(C_2H_5)_2$, $BF_3.NH(CH_3)C_2H_5$, etc. Such compounds give off the non-metal halides on heating. Tetrafluoroborates of aromatic or heterocyclic diazonium salts are also capped non-metal halides. They give off $BF_3$ photochemically. Diaryliodonium or triarylsulphonium salts with anions of the abovementiotied protic acids, e.g. $(C_6H_5)_2$ $I^+PF_6^-$, break up photochemically into the corresponding protic acids, e.g. $HPF_6$. Such capped products are known, for example, from R. S. Bauer in R. W. Tess, G. W. Poehlein (eds.) Applied Polymer Science, 2nd ed., ACS Symposium Series 285, ACS Washington, 1985, p. 931–961.

These adhesives may in addition include other components as well, such as glycidyl ethers or glycidyl esters, phenols or alcohols and, in the case of the photochemically curable adhesives, peroxides or ferrocene as well. Examples are glycidyl neodecanoate, hexanediol glycidyl ether, phenol, benzyl alcohol and cumene hydroperoxide.

Spacers may be admixed to these adhesives, so that the adhesive bead in a simple manner also ensures a constant distance between the two transparent plates. Typical distances are for example from 0.005 to 2 mm, preferably 0.01 to 0.5 mm. Examples of suitable spacers are glass or plastic beads and also screened fractions of sand, silicon carbide or similar materials.

The adhesive for sealing the electrochromic device after it has been filled with the electrochromic fluid is preferably a one-component epoxy adhesive comprising, for example, an epoxide compound and a capped Lewis or Brønsted acid or Lewis or Brønsted base compound which on exposure to heat or light, especially light, releases a Lewis or Brønsted acid or Lewis or Brønsted base compound, or an acrylate adhesive consisting preferably of a bis- and of a tris-acrylate component to which is admixed a photoinitiator which on exposure to light in the UV or adjacent blue spectral range releases free radicals.

With particular preference, the epoxide component comprises an epoxide of the formula

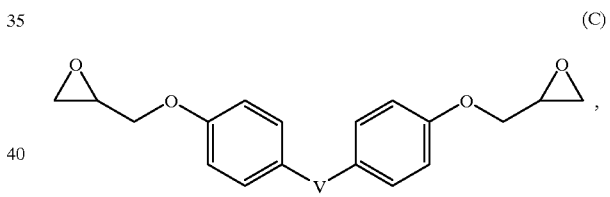

(C)

in which

V represents a bridge, which may likewise carry epoxy groups, and the Lewis acid compound, which is in capped form, comprises a non-metal halide, and the Brønsted acid compound, which is in capped form, comprises a strong protic acid which is derived from non-metal halides.

Lewis and Brønsted acids in their capped forms have been described in more detail above.

Likewise with particular preference, the acrylate mixture comprises compounds of the formulae

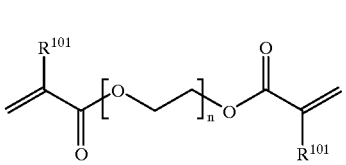

(CI)

in which

| | |
|---|---|
| n | represents an integer from 0 to 20, preferably from 0 to 10, and |
| $R^{101}$ | represents hydrogen or methyl, and |

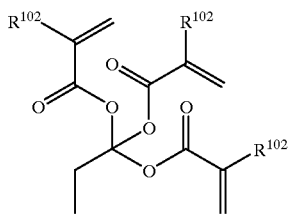

(CII)

in which $R^{102}$ represents hydrogen or methyl.

The composition of the acrylate mixture of (CI) and (CII) is with particular preference in the range (parts of CI)/(parts of CII)=1 to 5.

The photoinitiators are with particular preference compounds based on benzophenone derivatives or thioxanthones which on photolysis provide free radicals. In this context it is particularly preferred to use photoinitiators for UV curing, examples being Irgacure® 651 (Ciba-Geigy), Darocur® 1116, Darocur® 1173, Darocur® 1664, Darocur® 2273, Darocur® 4043 (all from E. Merck, Darmstadt). The particularly preferred concentration range of these photoinitiators is from 0.01 to 5% by weight.

With very particular preference the epoxide component of the epoxy adhesive according to the invention for the adhesive bead which holds together the two transparent plates at the desired distance is an epoxide of the formula in which m and p independently of one another represent an integer from 0 to 20, preferably from 0 to 5, and $R^{100}$ represents hydrogen or methyl and the aminic component is an aliphatic polyamine of the formula

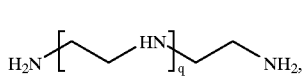

(CV)

in which q represents an integer from 2 to 10, preferably from 2 to 4, or is an araliphatic amine such as α,α'-diamino-m- or p-xylene or is polyaminoimidazoline or is an aromatic amine such as bis(4-aminophenyl) methane or bis(4-aminophenyl) sulphone and the capped Lewis acid compound is an adduct of boron trifluoride with secondary amines such as $BF_3$—$NH(CH_3)C_2H_5$ or is a diazonium salt such as Ar—$N_2^+BF_4^-$, or the capped Brønsted acid compound is an iodonium salt such as $(Ar)_2I^+BF_4^-$ or the $(Ar)_2I^+PF_6^-$ or is a sulphonium salt such as $(Ar)_3S^+BF_4^-$ or $(Ar)_3S^+PF_6^-$ in which Ar represents an aromatic radical, preferably phenyl.

With very particular preference the epoxide component of the epoxy adhesive according to the invention for cell sealing is an epoxide of the formula

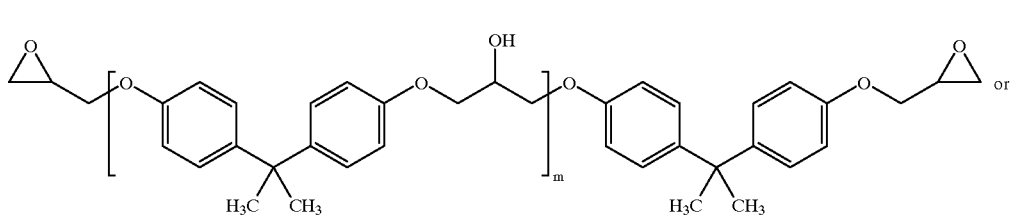

(CIII)

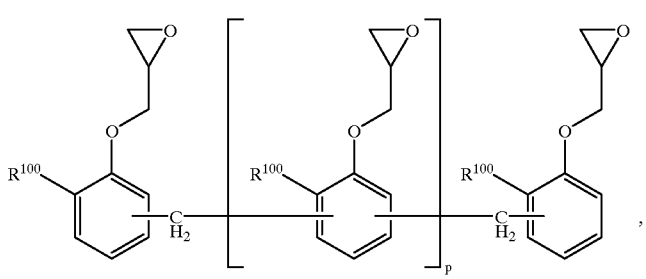

(CIV)

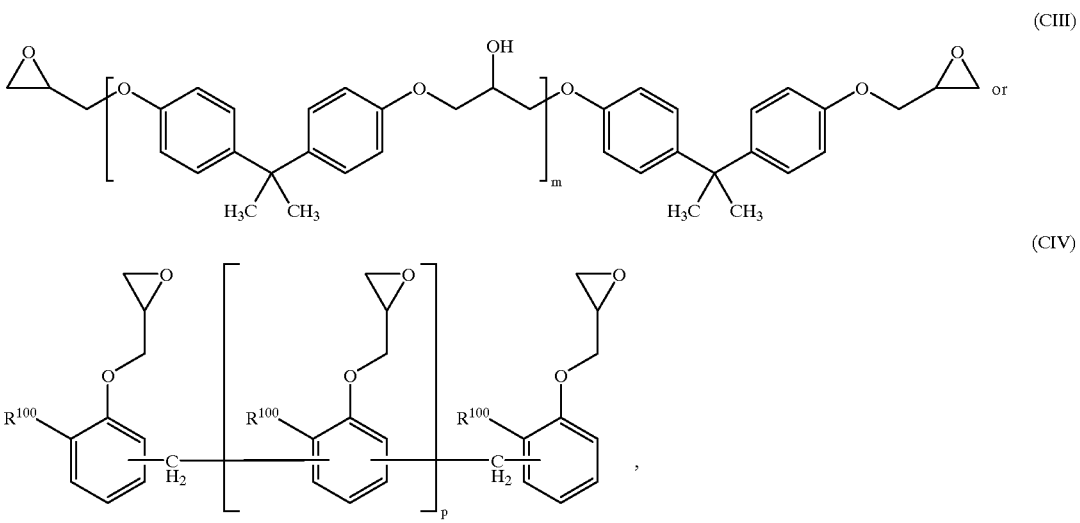

in which
- m and p independently of one another represent an integer from 0 to 20, preferably from 0 to 5, and
- $R^{100}$ represents hydrogen or methyl, and the capped Lewis acid compound is an adduct of boron trifluoride with secondary amines such as $BF_3 \cdot NH(CH_3)C_2H_5$ or is a diazonium salt such as $Ar\text{---}N_2^+BF_4^-$ or the capped Brønsted acid compound is an iodonium salt such as $(Ar)_2I^+BF_4^-$ or $(Ar)_2I^+PF_6^-$ or is a sulphonium salt such as $(Ar)_3S^+BF_4^-$ or $(Ar)_3S^+PF_6^-$ in which Ar represents an aromatic radical, preferably phenyl.

Likewise with very particular preference the acrylates for cell sealing comprise a mixture of compounds of the formulae (CI)

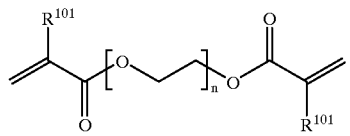

in which

| | |
|---|---|
| n | represents an integer from 0 to 20, preferably from 5 to 15, and |
| $R^{101}$ | represents hydrogen or methyl, and |

(CII)

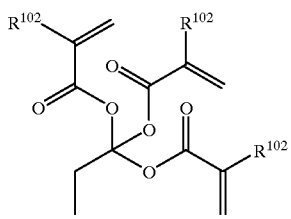

in which $R^{102}$ represents hydrogen or methyl.

The composition of the acrylate mixture of (CI) and (CII) is with very particular preference in the range (parts of CI)/(parts of CII)=1 to 2.

With very particular preference the photoinitiators comprise compounds based on benzophenonone derivatives or thioxanthones which on photolysis provide free radicals. Very particular preference is given in this context to photoinitiators for UV curing, examples being especially Darocur® 1173 (E. Merck, Darmstadt) and Irgacure® 651 (Ciba-Geigy). The very particularly preferred concentration range of these photoinitiators is from 0.1 to 3% by weight.

Especially preferred thermally curing epoxy adhesives comprise epoxides of the formula (CIII)

in which m represents from 2 to 5 and amines of the formula (CV)

in which q represents from 2 to 4 and also α,α'-diamino-m-xylene or mixtures thereof and also, if desired, further epoxide compounds, such as glycidyl esters, an example being glycidyl neodecanoate, and/or glycidyl ethers, an example being hexanediol glycidyl ether.

Especially preferred photochemically curing epoxy adhesives, or epoxy adhesives curing with photochemical initiation, comprise epoxides of the formula (CIII)

in which m represents from 2 to 5 and as capped Lewis acid compound a diazonium salt such as $Ar\text{---}N_2^+BF_4^-$ or the capped Brønsted acid compound an iodonium salt such as $(Ar)_2I^+BF_4^-$ or $(Ar)_2I^+PF_6^-$ or a sulphonium salt such as $(Ar)_3S^+BF_4^-$ or $(Ar)_3S^+PF_6^-$ in which Ar represents an aromatic radical, preferably phenyl.

Especially preferred photochemically curing acrylate adhesives comprise acrylates of the formulae (CI)

in which n represents from 5 to 10 and $R^{101}$ represents hydrogen, and (CII)

in which $R^{102}$ represents hydrogen.

The especially preferred composition of the acrylate mixture of (CI) and (CII) is (parts of CI)/(parts of CII)=5/3.

The especially preferred photoinitiator Darocur® 1173 (E. Merck, Darmstadt) is employed in this context in a concentration of 0.5% by weight.

The epoxy and acrylate adhesives preferably are of high viscosity. This facilitates the application of the adhesive when the two transparent plates are joined together, and the bead of adhesive does not run in the course of curing. Problems are thereby avoided especially when sealing the cells filled with the electrochromic fluid of the invention, since adhesives of relatively high viscosity do not mix so readily with the fluid as do low-viscosity adhesives. Instances of such mixing may lead to an inadequate adhesive effect, but may also lead to the in some cases unwanted bonding and hence deactivation of the conductive coating in the interior of the cell. Highly suitable viscosities are, for example, >10,000 mPas, preferably >20,000 mPas and, with particular preference, >30,000 mPas. The viscosity can be influenced by the adhesive components themselves by way, for example, of the degree of oligomerization n, m, p and/or q in the above formulae (CI) and (CIII) to (CV). It can, however, also be influenced by additives such as fillers. Such filters may be Aerosils, based for example on silica gels or the like, clays, organic clays, cements, silicates, sands, silicon carbide powder, glass powder or quartz powder, organic polymer powders or polymer particles, or organic oligomers, such as ureas, urethanes, amides, polyesters and the like. Preference is given to Aerosils. Such fillers also reduce the shrinkage on curing and hence prevent a change in the shape of the adhesive bead or even the formation of cracks in the adhesive bead.

The curing of the adhesives depends on their chemical compositions.

Thermally curable epoxy adhesives based on epoxides of the formula (CIII)
in which
m represents from 2 to 5,
and amines of the formula (CV)
in which
q represents from 2 to 4,
and also α,α'-diamino-m-xylene, or mixtures thereof, and, if desired, further epoxide compounds, such as glycidyl esters, an example being glycidyl neodecanoate, are cured, for example, at temperatures from 90 to 170° C., preferably from 110 to 150° C. over a period of, for example, from 5 to 60 min, preferably from 10 to 30 min.

Epoxy adhesives which cure photochemically or with photochemical initiation and are based on epoxides of the formula (CIII)
in which
m represents from 2 to 5
and a capped Lewis acid, for example $NO_2-C_6H_4-N_2^+$ $BF_4^-$, or a capped Brønsted acid compound, for example $(C_6H_5)_2I^+BF_4^-$ or $(C_6H_5)_2I^+PF_6^-$ or $(C_6H_5)_3S^+BF_4^-$ or $(C_6H_5)_3S^+PF_6^-$, are either cured completely by means of visible or UV light or more advantageously are only initiated by visible or UV light, with the adhesive not undergoing full cure, and then are cured to completion at room temperature or elevated temperature, for example at from 30 to 150° C., preferably at from 70 to 130° C. The curing time depends on the temperature. At room temperature, for example, it may be from 10 to 24 h, at 110° C. only from 10 to 30 min, however. Exposure can be carried out using a UV lamp, a flashlamp or else possibly daylight or light from daylight lamps.

In adhesives which have been fully cured in this way the adhesive constituents, especially the epoxide and aminic constituents, are incorporated so firmly and fully into the macromolecular structure that they are no longer able to react with the electrochromic fluid of the invention or with the species formed by reduction or oxidation. The bonds are also so firm that they easily withstand thermal loads of, for example, between −40 and +105° C. and also, in this temperature range, the electrochromic fluid of the invention does not start to dissolve them, cause them to swell or infiltrate them.

Photochemically curable acrylate adhesives based on acrylates of the formulae (CI)
in which
n represents from 5 to 15 and
$R^{101}$ represents hydrogen, and
(CII)
in which
$R^{102}$ represents hydrogen,
with a composition of the acrylate mixture (parts of CI)/(parts of CII)=5/3 and a concentration of Darocur® 1173 photoinitiator of 0.5% by weight are cured fully at room temperature by UV light from a suitable lamp.

Bonds cured in this way easily withstand thermal loads, for example, of between −40 and +105° C. and also, in this temperature range, the electrochromic fluid according to the invention does not start to dissolve them, to swell or infiltrate them.

Preferably, the electrochromic fluid comprises at least one oxidizable substance $RED_1$, which releases electrons at an anode, and at least one reducible substance $OX_2$, which accepts electrons at a cathode, and in so doing undergo transition into their respective forms $OX_1$ and $RED_2$, at least one of these releases or acceptances of electrons being associated with a change in the absorbance in the visible region of the spectrum, with the original forms $RED_1$ and $OX_2$ being reformed in each case following charge equalization. In particular, at least one of the substances present, $RED_1$ and $OX_2$, is linked covalently to the other via a bridge.

The reduction and oxidation processes in the fluid of the electrochromic device of the invention generally take place by electrons being accepted or released at a cathode or anode, respectively, a potential difference of from 0.3 to 3 V preferably obtaining between the electrodes. After the electrical potential has been switched off, charge equalization takes place—in general spontaneously—between the substances $RED_2$ and $OX_1$, accompanied by disappearance or fading of the colour. Such charge equalization also takes place even while the current is flowing in the interior of the electrolyte volume.

In its electrochromic fluid, the electomic device of the invention preferably comprises at least one electrochromic substance of the formula (I)

$$Y[(B-Z)_AB-Y)_B]_CB-Z \qquad (I),$$

in which
Y and Z independently of one another represent a radical $OX_2$ or $RED_1$, subject to the proviso that at least one Y represents $OX_2$ and at least one Z represents $RED_1$, where
$OX_2$ represents the radical of a reversibly electrochemically reducible redox system, and
$RED_1$ represents the radical of a reversibly electrochemically oxidizable redox system,
B represents a bridge member, c represents an integer from 0 to 1000, preferably from 0 to 100 and, with particular preference, from 0 to 5, and a and b independently of one another represent an integer from 0 to 100, preferably an integer from 0 to 10 and, with particular preference, represent from 0 to 3.

Preferably (a+b)–c is ≦10,000, particularly preferably 100.

In its electrochromic fluid, the electrochromic device preferably comprises at least one electrochromic substance of the formula (I) in which Y represents $OX_2$ and Z represents $RED_1$ and Y and Z alternate in their sequence.

With particular preference, in its electrochromic fluid, the electrochromic device of the invention comprises at least one electrochromic substance of the formula

| | |
|---|---|
| $OX_2$-B-$RED_1$ | (Ia), |
| $OX_2$-B-$RED_1$-B-$OX_2$ | (Ib), |
| $RED_1$-B-$OX_2$-b-$RED_1$ | (Ic), or |
| $OX_2$-(B-$RED_1$-B-$OX_2$)d-B-$RED_1$ | (Id) | in which $OX_2$, $RED_1$ and B have the meaning indicated above and d represents an integer from 1 to 5.

With very particular preference, in its electrochromic fluid, the electrochromic device of the invention comprises at least one electrochromic substance of the formulae (Ia)–(Id) in which $OX_2$ represents the radical of a cathiodically reducible substance which in its cyclic voltammogram, recorded in an inert solvent at room temperature, exhibits at least two chemically reversible reduction waves, the first of these reduction waves leading to an increase in the absorbance at at least one wavelength in the visible region of the electromagnetic spectrum, $RED_1$ represents the radical of the anodically reversibly oxidizable substance which in its cyclic voltammogram, recorded in an inert solvent at room temperature, exhibits at least two chemically reversible oxidation waves, the first of these oxidation waves leading to an increase in the absorbance at at least one wavelength in the visible region of the electromagnetic spectrum, and B represents a bridge member.

Particular preference is given to an electrochromic device of the invention which comprises at least one substance of the formula (Ia)–(Id) in which $OX_2$ represents a radical of the formula

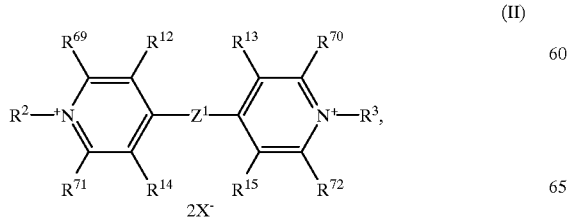

(II)

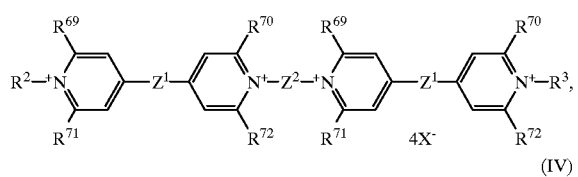

(III)

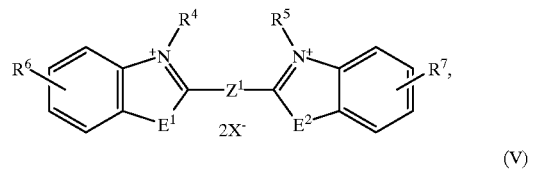

(IV)

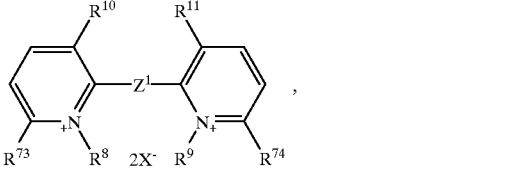

(V)

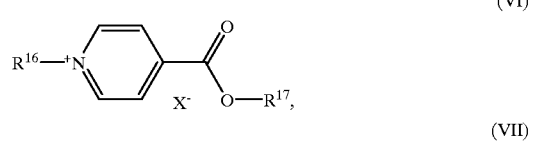

(VI)

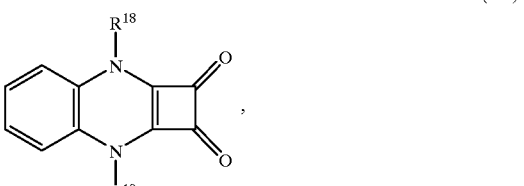

(VII)

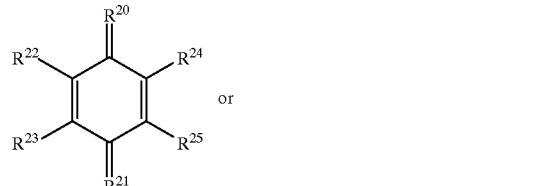

(VIII)

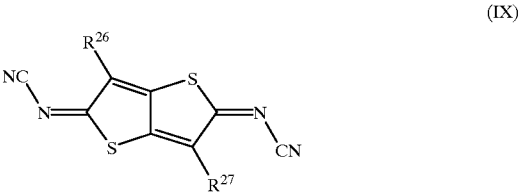

(IX)

where $R^2$ to $R^5$, $R^8$, $R^9$, $R^{16}$ to $R^{19}$ independently of one another denote $C_1$- to $C_{18}$-alkyl $C_2$- to $C_{12}$-alkenyl, $C_3$- to $C_7$-cycloalkyl, $C_7$- to $C_{15}$-aralkyl or $C_6$- to $C_{10}$-aryl, or $R^4$ and $R^5$, or $R^8$ and $R^9$ together form a —$(CH_2)_2$— or —$(CH_2)_3$— bridge, $R^6$, $R^7$ and $R^{22}$ to $R^{25}$ independently of one another denote hydrogen, $C_1$- to $C_4$-alkyl, $C_1$- to $C_4$-alkoxy, halogen, cyano, nitro or $C_1$- to $C_4$-alkoxycarbonyl, or $R^{22}$ and $R^{23}$ and/or $R^{24}$ and $R^{25}$ form a —CH═CH—CH═CH— bridge, $R^{10}$ and $R^{11}$; $R^{12}$ and $R^{13}$; $R^{14}$ and $R^{15}$ independently of one another denote hydrogen or in pairs denote a —(CH$_2$)$_2$—, —(CH$_2$)$_3$— or —CH=CH— bridge, $R^{20}$ and $R^{21}$ independently of one another denote O, N—CN, C(CN)$_2$ or N—C$_6$— to C$_{10}$-aryl, $R^{26}$ denotes hydrogen, C$_1$- to C$_4$-alkyl, C$_1$- to C$_4$-alkoxy, halogen, cyano, nitro, C$_1$- to C$_4$-alkoxycarbonyl or C$_6$- to C$_{10}$-aryl, $R^{29}$ to $R^{74}$ independently of one another denote hydrogen or C$_1$–C$_6$-alkyl, or $R^{69}$; $R^{12}$ and/or $R^{70}$; $R^{13}$ form a —CH=CH—CH=CH— bridge, E$^1$ and E$^2$ independently of one another denote O, S, NR$^1$ or C(CH$_3$)$_2$ or E$^1$ and E$^2$ together form a —N—(CH$_2$)$_2$—N— bridge, $R^1$ denotes C$_1$- to C$_{18}$-alkyl, C$_2$- to C$_{12}$-alkenyl, C$_4$- to C$_7$-cycloalkyl, C$_7$- to C$_{15}$-aralkyl or C$_6$- to C$_{10}$-aryl, $Z^1$ denotes a direct bond, —CH=CH—, —C(CH$_3$)=CH—, —C(CN)=CH—, —CCl=CCl—, —C(OH)=CH—, —CCl=CH—, —C≡C—, —CH=N—N=CH—, —C(CH$_3$)=N—N=C(CH$_3$)— or —CCl=N—N=CCl—, $Z^2$ denotes —(CH$_2$)$_r$— or —CH$_2$—C$_6$H$_4$—CH$_2$—, r denotes an integer from 1 to 10, X$^-$ denotes an anion which is redox-inert under the conditions, where the bond to the bridge member B is via one of the radicals R$^2$–R$^{19}$, R$^{22}$–R$^{27}$ or, if E$^1$ or E$^2$ represents NR$^1$, is via R$^1$, and the radicals mentioned in that case represent a direct bond, RED$_1$ represents one of the following radicals

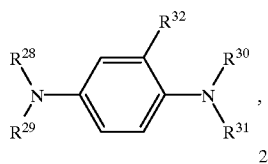 (X)

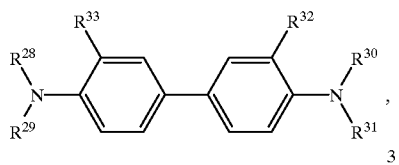 (XI)

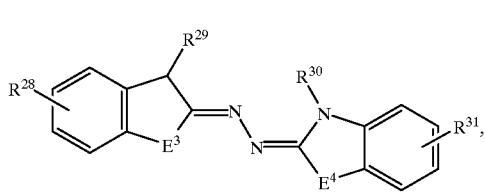 (XII)

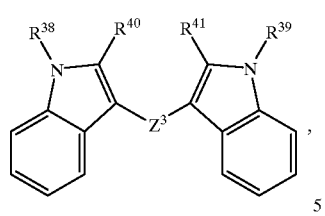 (XIII)

-continued

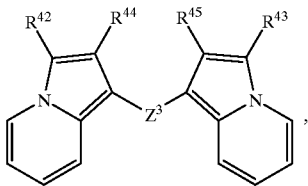 (XIV)

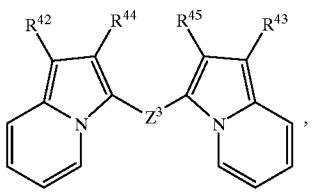 (XV)

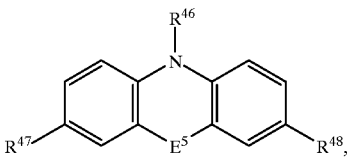 (XVI)

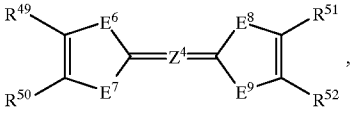 (XVII)

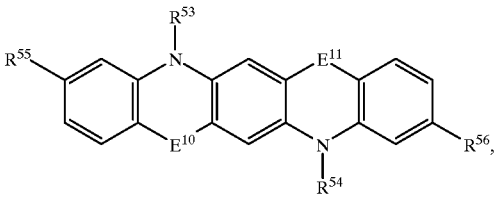 (XVIII)

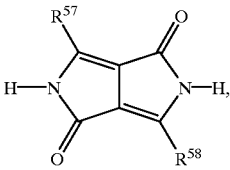 (XIX)

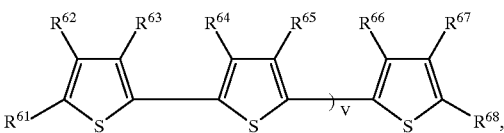 (XX)

in which

R$^{28}$ to R$^{31}$, R$^{34}$, R$^{35}$, R$^{38}$, R$^{39}$, R$^{46}$, R$^{53}$ and R$^{54}$ independently of one another denote C$_1$- to C$_{18}$-alkyl, C$_2$- to C$_{12}$-alkenyl, C$_3$- to C$_7$-cycloalkyl, C$_7$- to C$_{15}$-aralkyl or C$_6$- to C$_{10}$-aryl, and R$^{46}$, R$^{53}$ and R$^{54}$ additionally denote hydrogen, R$^{32}$, R$^{33}$, R$^{36}$, R$^{37}$, R$^{40}$, R$^{41}$, R$^{42}$, to R$^{45}$, R$^{47}$, R$^{48}$, R$^{49}$ to R$^{52}$ and R$^{55}$ to R$^{57}$ independently of one another denote hydrogen, C$_1$- to C$_4$-alkyl, C$_1$- to C$_4$-alkyl, C$_1$- to C$_4$-alkoxy, halogen, cyano, nitro, C$_1$- to C$_4$-alkoxycarbonyl or C$_6$- to C$_{10}$-aryl and R$^{57}$ and R$^{58}$ additionally denote an optionally benzo-fused aromatic or quasiaromatic five- or six-membered heterocyclic ring and $R^{48}$ additionally denotes $NR^{75}R^{76}$, $R^{49}$ and $R^{50}$ and/or $R^{51}$ and $R^{52}$ form a —$(CH_2)_3$—, —$(CH_2)_4$—, —$(CH_2)_5$— or —CH=CH—CH=CH— bridge, $Z^3$ denotes a direct bond or a —CH=CH— or —N=N— bridge, =$Z^4$= denotes a direct double bond or a =CH—CH= or =N—N=bridge, $E^3$ to $E^5$, $E^{10}$ and $E^{11}$ independently of one another denote O, S, $NR^{59}$ or $C(CH_3)_2$ and $E^5$ additionally denotes C=O or $SO_2$, or $E^3$ and $E^4$ independently of one another denote —CH=CH—, $E^6$ to $E^9$ independently of one another denote S, Se or $NR^{59}$, $R^{59}$, $R^{75}$ and $R^{76}$ independently of one another denote $C_1$- to $C_{12}$-alkyl, $C_2$- to $C_8$-alkenyl, $C_3$- to $C_7$-cycloalkyl, $C_7$- to $C_{15}$-aralkyl or $C_6$- to $C_{10}$-aryl and $R^{73}$ additionally denotes hydrogen, or $R^{75}$ and $R^{76}$ in the definition of $NR^{75}R^{76}$ form, together with the N atom to which they are attached, a five- or six-membered, saturated ring which can contain further heteroatoms, $R^{61}$ to $R^{68}$ independently of one another denote hydrogen, $C_1$- to $C_6$-alkyl, $C_1$- to $C_4$-alkoxy, cyano, $C_1$- to $C_4$-alkoxycarbonyl or $C_6$- to $C_{10}$-aryl, or $R^{61}$; $R^{62}$ and $R^{67}$; $R^{68}$ independently of one another together form a —$(CH_2)_3$—, —$(CH_2)_4$— or —CH=CH—CH=CH— bridge, v denotes an integer between 0 and 10, where the bond to the bridge member B is via one of the radicals $R^{28}$–$R^{58}$, $R^{61}$, $R^{62}$, $R^{67}$, $R^{68}$ or, if one of the radicals $E^3$–$E^{11}$ represents $NR^{59}$, is via $R^{59}$, and the radicals mentioned in that case represent a direct bond, and B represents a bridge member of the formula —$(CH_2)_n$— or —$[Y^1{}_s(CH_2)_m—Y^2]_o$—$(CH_2)_p$—$Y^3{}_q$—, each of which is optionally substituted by $C_1$–$C_4$-alkyl, $C_1$- to $C_4$-alkoxy, halogen or phenyl, $Y^1$ to $Y^3$ independently of one another represent O, S, $NR^{60}$, COO, CONH, NHCONH, cyclopentanediyl, cyclohexanediyl, phenylene or naphthylene, $R^{60}$ denotes $C_1$- to $C_6$-alkyl, $C_2$- to $C_6$-alkenyl, $C_4$- to $C_7$-cycloalkyl, $C_7$- to $C_{15}$-aralkyl or $C_6$- to $C_{10}$-aryl, n denotes an integer from 1 to 12, m and p independently of one another denote an integer from 0 to 8 o denotes an integer from 0 to 6 and q and s independently of one another denote 0 or 1.

Very particular preference is given to an electrochromic system according to the invention which comprises at least one substance of the formula (Ia)–(Id) in which $OX_2$ represents a radical of the formula (II), (III), (IV) or (V)

where $R^2$, $R^3$, $R^4$, $R^5$, $R^8$ and $R^9$ independently of one another represent $C_1$- to $C_{12}$-alkyl, $C_2$- to $C_8$-alkenyl, $C_5$- to $C_7$-cycloalkyl, $C_7$- to $C_{15}$-aralkyl or $C_6$- to $C_{10}$-aryl, $R^6$ and $R^7$ independently of one another represent hydrogen, methyl, ethyl, methoxy, ethoxy, fluorine, chlorine, bromine, cyano, nitro, methoxycarbonyl or ethoxycarbonyl, $R^{10}$, $R^{11}$; $R^{12}$, $R^{13}$ and $R^{14}$, $R^{15}$ independently of one another represent hydrogen or, if $Z^1$ denotes a direct bond, in each case represent together a —$(CH_2)_2$—, —$(CH_2)_3$— or —CH=CH— bridge, or $R^4$, $R^5$ and $R^8$, $R^9$ independently of one another in pairs together represent a —$(CH_2)_2$— or —$(CH_2)_3$— bridge if $Z^1$ denotes a direct bond, $R^{69}$ to $R^{74}$ independently of one another denote hydrogen or $C_1$–$C_4$-alkyl, $E^1$ and $E^2$ are identical and represent O, S, $NR^1$ or $C(CH_3)_2$ or together form a —N—$(CH_2)_2$—N— bridge, $R^1$ represents $C_1$- to $C_{12}$-alkyl, $C_2$- to $C_4$-alkenyl, $C_5$- to $C_7$-cycloalkyl, $C_7$- to $C_{15}$-aralkyl or $C_6$- to $C_{10}$-aryl, $Z^1$ represents a direct bond, —CH=CH—, —$C(CH_3)$=CH—, —C(CN)=CH—, —C≡C— or —CH=N—N=CH—, $Z^2$ represents —$(CH)_r$— or —$CH_2$—$C_6H_4$—$CH_2$—, r represents an integer between 1 and 6, $X^-$ represents a colourless anion which is redox-inert under the conditions, where the bond to the bridge member B is via one of the radicals $R^2$–$R^{11}$ or, if $E^1$ or $E^2$ represents $NR^1$, is via $R^1$, and the radicals mentioned in that case represent a direct bond, $RED_1$ represents a radical of the formula (X), (XI), (XII), (XIII), (XVI), (XVII), (XVIII) or (XX), where $R^{28}$ to $R^{31}$, $R^{34}$, $R^{35}$, $R^{38}$, $R^{39}$, $R^{46}$, $R^{53}$ and $R^{54}$ independently of one another denote $C_1$- to $C_{12}$-alkyl, $C_2$- to $C_8$-alkenyl, $C_5$- to $C_7$-cycloalkyl, $C_7$- to $C_{15}$-aralkyl or $C_6$- to $C_{10}$-aryl and $R^{46}$, $R^{53}$ and $R^{54}$ additionally denote hydrogen, $R^{32}$, $R^{33}$, $R^{36}$, $R^{37}$, $R^{40}$, $R^{41}$, $R^{47}$ to $R^{52}$, $R^{55}$ and $R^{56}$ independently of one another denote hydrogen, methyl, ethyl, methoxy, ethoxy, fluorine, chlorine, bromine, cyano, nitro, methoxycarbonyl, ethoxycarbonyl or phenyl and $R^{57}$ and $R^{58}$ additionally denote 2- or 4-pyridin and $R^{48}$ additionally denotes $NR^{75}R^{76}$ $Z^3$ denotes a direct bond or a —CH=CH— or —N=N— bridge, =$Z^4$= denotes a direct double bond or a =CH—CH= or =N—N= bridge, $E^3$ to $E^5$, $E^{10}$ and $E^{11}$ independently of one another denote O, S, $NR^{59}$ or $C(CH_3)_2$, but $E^3$ and $E^4$ have the same meaning, $E^6$ to $E^9$ are identical to one another and denote S, Se or $NR^{59}$ and $E^5$ additionally denotes C=O, $E^6$ represents $NR^{59}$, where $R^{59}$ denotes a direct bond to the bridge B, and $E^7$ to $E^9$ possess the meaning indicated above but need not be identical to one another, $R^{59}$, $R^{75}$ and $R^{76}$ independently of one another denote $C_1$- to $C_{12}$-alkyl, $C_2$- to $C_8$-alkenyl, $C_5$- to $C_7$-cycloalkyl, $C_7$- to $C_{15}$-aralkyl or $C_6$- to $C_{10}$-aryl, and $R^{73}$ additionally denotes hydrogen, or $R^{75}$ and $R^{76}$ in the definition $NR^{75}R^{76}$, together with the N atom to which they are attached, denote pyrrolidino, piperidino or morpholino, $R^{61}$, $R^{62}$ and $R^{67}$, $R^{68}$ independently of one another represent hydrogen, $C_1$- to $C_4$-alkyl, methoxycarbonyl, ethoxycarbonyl or phenyl or in pairs together represent a —$(CH_2)_3$— or —$(CH_2)_4$— bridge, $R^{63}$ to $R^{66}$ represent hydrogen and v represents an integer from 1 to 6, where the bond to the bridge member B is via one of the radicals $R^{28}$–$R^{41}$, $R^{46}$–$R^{56}$, $R^{61}$, $R^{62}$, $R^{67}$, $R^{68}$ or, if one of the radicals $E^3$–$E^{11}$ represents $NR^{59}$, is via $R^{59}$, and the radicals mentioned in that case represent a direct bond, B represents a bridge member of the formulae
—(CH$_2$)$_n$—, —(CH$_2$)$_m$—O—(CH$_2$)$_p$—, —(CH)$_m$—NR$^{60}$—(CH$_2$)$_p$—, —(CH$_2$)$_m$—C$_6$H$_4$—(CH$_2$)$_p$—, —[O—(CH$_2$)$_p$]$_o$—O—, —[NR$^{60}$—(CH$_2$)$_p$]$_o$—NR$^{60}$—, —[C$_6$H$_4$—(CH$_2$)$_p$]$_o$—C$_6$H$_4$—, —(CH$_2$)$_m$—OCO—C$_6$H$_4$—COO—(CH$_2$)$_p$—, —(CH$_2$)$_m$—NHCO—C$_6$H$_4$—CONH—(CH$_2$)$_p$—, —(CH$_2$)$_m$—NHCONH—C$_6$H$_4$—NHCONH—(CH$_2$)$_p$—, —(CH$_2$)$_m$—OCO—(CH$_2$)$_t$—COO—(CH$_2$)—, —(CH$_2$)$_m$—NHCO—(CH$_2$)$_t$—CONH—(CH$_2$)$_p$—, —(CH$_2$)$_m$—NHCONH—(CH$_2$)$_t$—NHCONH—(CH$_2$)p—, $R^{60}$ represents methyl, ethyl, benzyl or phenyl, n represents an integer from 1 to 10, m and p independently of one another represent an integer from 0 to 4, o represents an integer from 0 to 2 and t represents an integer from 1 to 6.

Particular preference is given to an electrochromic system of the invention which comprises at least one substance of the formula (Ia)–(Id)

in which $OX_2$ represents a radical of the formula (II), (IV) or (V) in which $R^2$, $R^4$ and $R^8$ represent a direct bond to the bridge member B, $R^3$, $R^5$ and $R^9$ independently of one another represent methyl, ethyl, propyl, butyl, pentyl, hexyl, heptyl, octyl, benzyl or phenyl or, in the case of the formula Ic or Id, likewise represent a direct bond to the bridge member B, $R^6$ and $R^7$ are identical and represent hydrogen, methyl, methoxy, chlorine, cyano or methoxycarbonyl, $R^{10}$, $R^{11}$; $R^{12}$, $R^{13}$ and $R^{14}$, $R^{15}$ independently of one another represent hydrogen or, if $Z^1$ denotes a direct bond, in each case together in pairs represent a —CH=CH— bridge, $R^{69}$ to $R^{72}$ are identical and denote hydrogen, methyl or ethyl, $R^{73}$ and $R^{74}$ denote hydrogen, $E^1$ and $E^2$ are identical and represent O or S, $Z^1$ represents a direct bond or —CH=CH—, $X^-$ represents a colourless anion which is redox-inert under the conditions, $RED_1$ represents a radical of the formula (X), (XII), (XIII), (XVI) or (XVII), $R^{28}$, $R^{34}$, $R^{38}$, $R^{46}$ and $R^{49}$ represent a direct bond to the bridge member B, $R^{29}$ to $R^{31}$, $R^{35}$ and $R^{39}$ independently of one another represent methyl, ethyl, propyl, butyl, pentyl, hexyl, heptyl, octyl, benzyl or phenyl or, in the case of the formula Ib or Id, $R^{30}$, $R^{35}$ and $R^{39}$ likewise represent the direct bond to the bridge member B, $R^{32}$ $R^{47}$ and $R^{48}$ represent hydrogen, $R^{36}$, $R^{37}$, $R^{40}$, $R^{41}$ and $R^{50}$ to $R^{52}$ independently of one another represent hydrogen, methyl, methoxy, chlorine, cyano, methoxycarbonyl or phenyl or, in the case of the formula Ib or Id, $R^{51}$ likewise represents a direct bond to the bridge member B, $Z^3$ represents a direct bond or a —CH=CH— or —N=N— bridge, =$Z^4$= represents a direct double bond or an =CH—CH= or =N—N= bridge, $E^3$ to $E^5$ independently of one another represent O, S or $NR^{59}$, but $E^3$ and $E^4$ have the same meaning, $E^6$ to $E^9$ are identical to one another and represent S, Se or $NR^{59}$, $R^{59}$ represents methyl, ethyl, propyl, butyl, pentyl, hexyl, heptyl, octyl, benzyl or phenyl or, in the case of the formula XVI in Ib or Id, likewise represents a direct bond to the bridge member B, B represents a bridge member of the formulae
—(CH$_2$)$_n$—, —(CH$_2$)$_m$—O—(CH$_2$)$_p$—, —(CH)$_m$—NR$^{60}$—(CH$_2$)$_p$—, —(CH$_2$)$_m$C$_6$H$_4$—(CH$_2$)$_p$—, —O—(CH$_2$)$_p$—O—, —NR$^{60}$—(CH$_2$)$_p$—NR$^{60}$—, —(CH$_2$)$_m$—OCO—C$_6$H$_4$—COO—(CH$_2$)$_p$—, —(CH$_2$)$_m$—NHCO—C$_6$H$_4$—CONH—(CH$_2$)$_p$—, —(CH$_2$)$_m$—NHCONH—C$_6$H$_4$—NHCONH—(CH$_2$)$_p$—, —(CH$_2$)$_m$—OCO—(CH$_2$)$_t$—COO—(CH$_2$)—, —(CH$_2$)$_m$—NHCO—(CH$_2$)$_t$—CONH—(CH$_2$)$_p$—, —(CH$_2$)$_m$—NHCONH—(CH$_2$)$_t$—NHCONH—(CH$_2$)$_p$—, $R^{60}$ represents methyl, n represents an integer from 1 to 10, m and p are identical and represent an integer from 0 to 2 and t represents an integer from 1 to 6.

Very particular preference is given to an electrochromic device of the invention which comprises at least one substance of the formula (Ia) corresponding to one of the formulae (XXI)

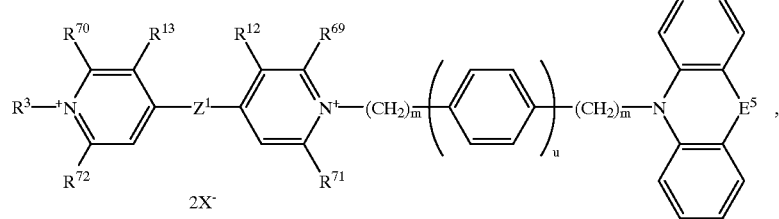

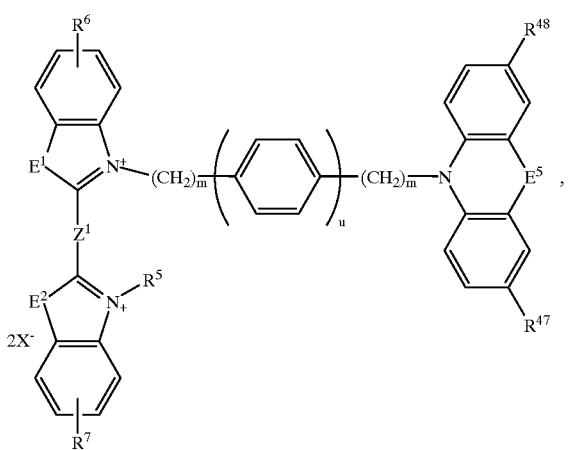
(XXII)
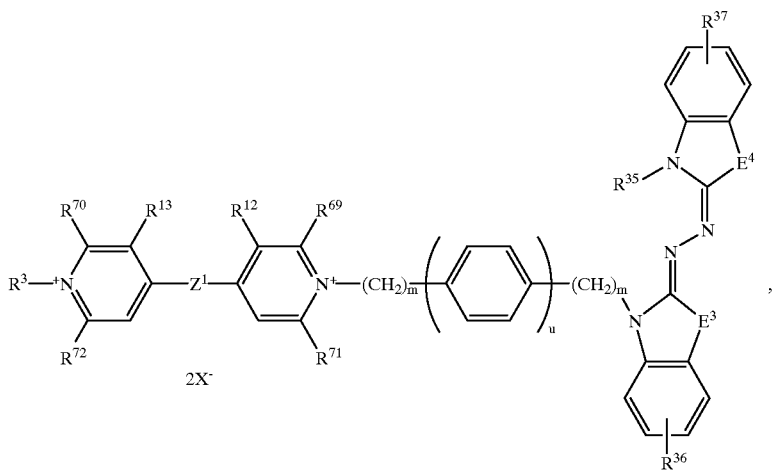
(XXIII)
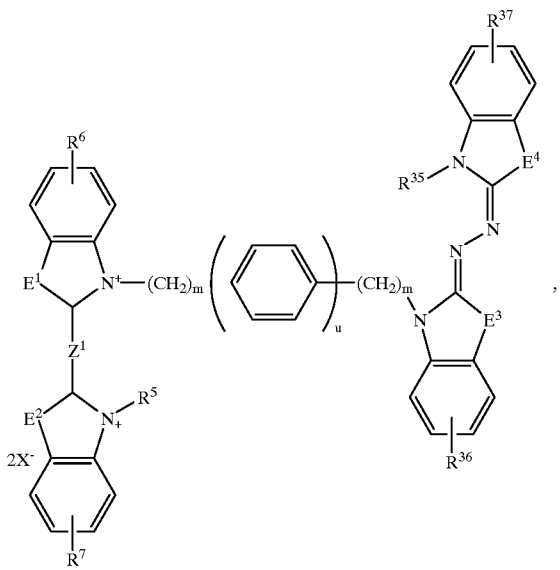
(XXIV)

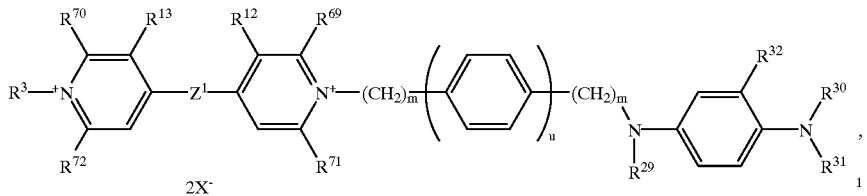
(XXV)
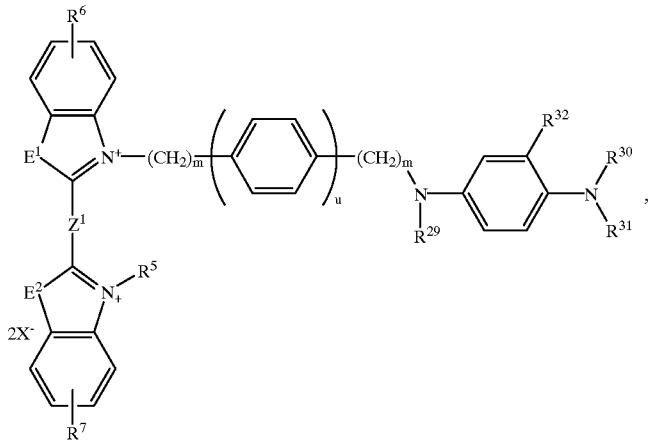
(XXVI)
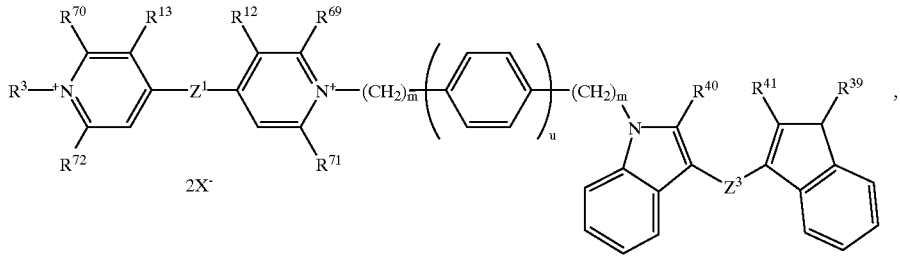
(XXVII)
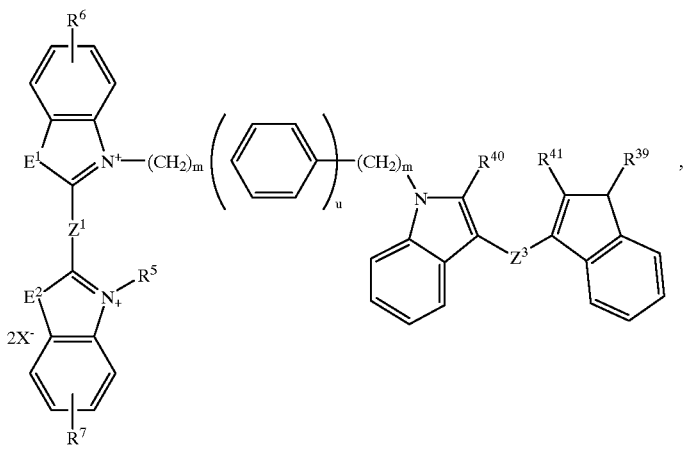
(XXVIII)

-continued
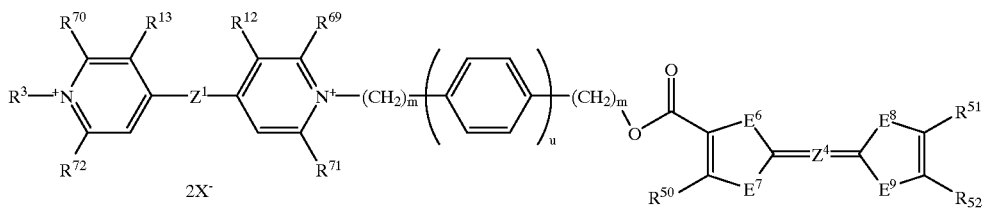
(XXIX)
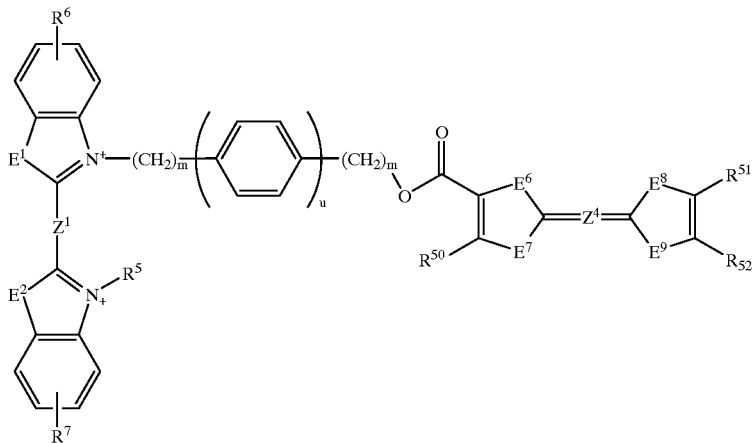
(XXIX)
or at least one substance of the formula (Ib) corresponding to one of the formulae
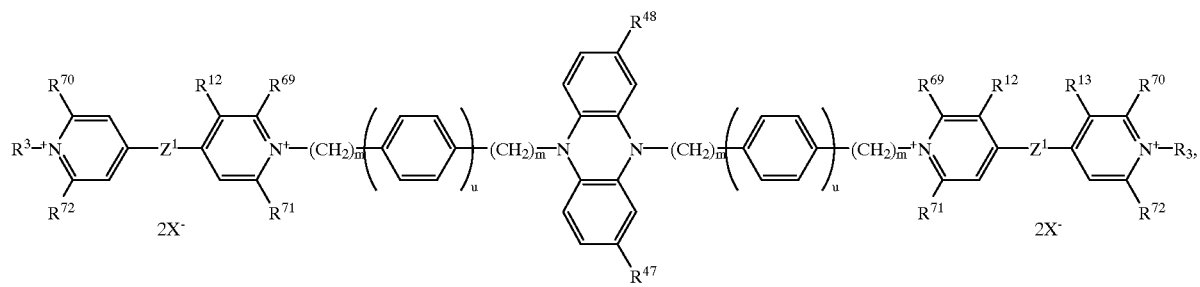
(XXXI)
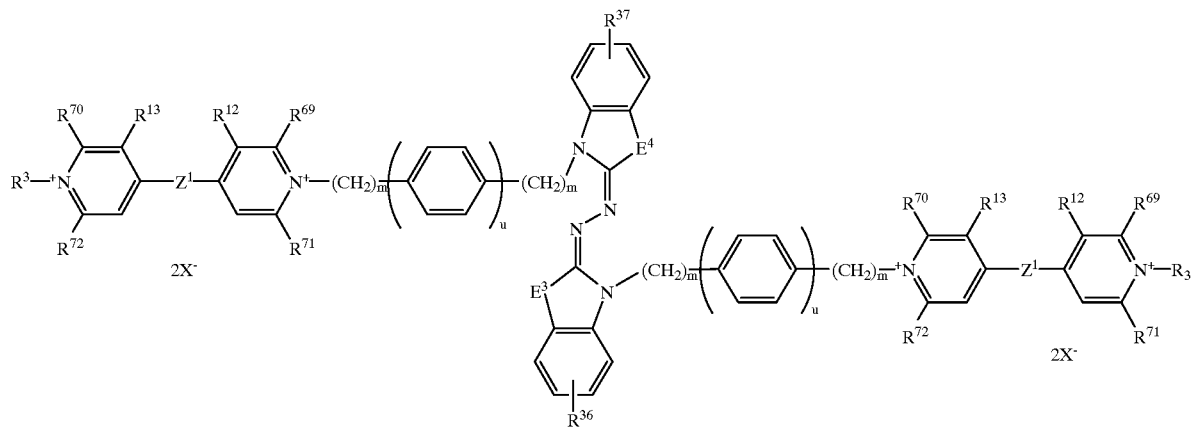
(XXXII)

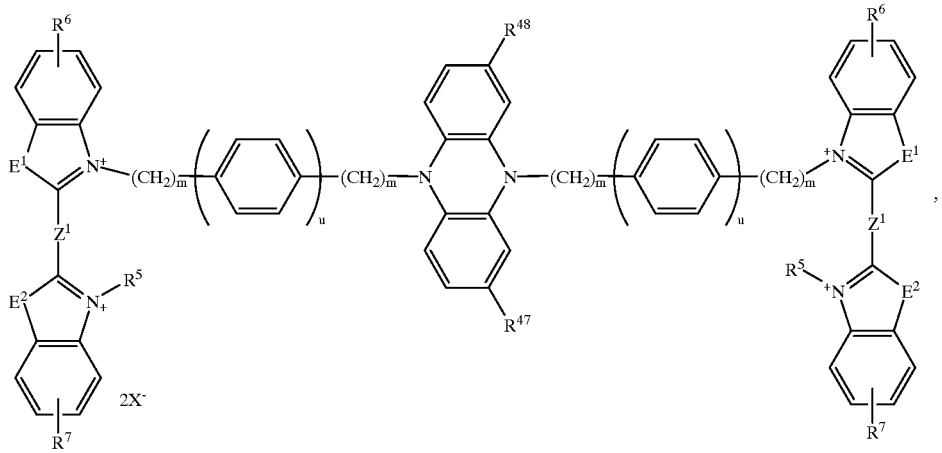
(XXXIII)
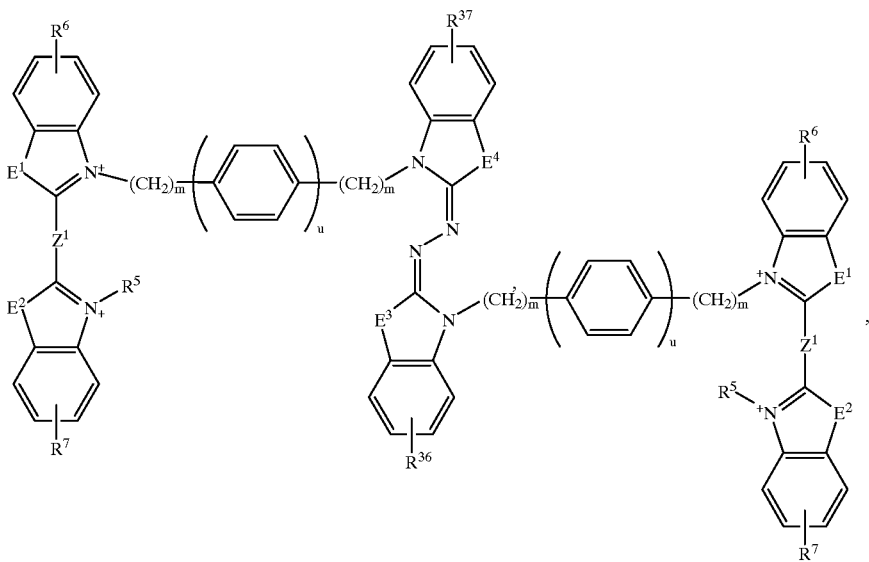
(XXXIV)
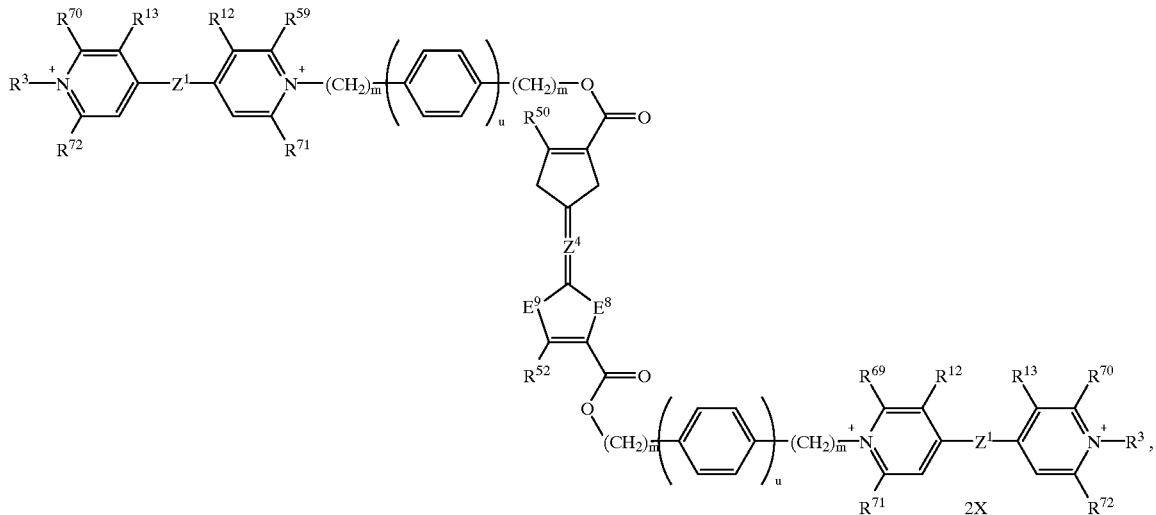
(XXXV)

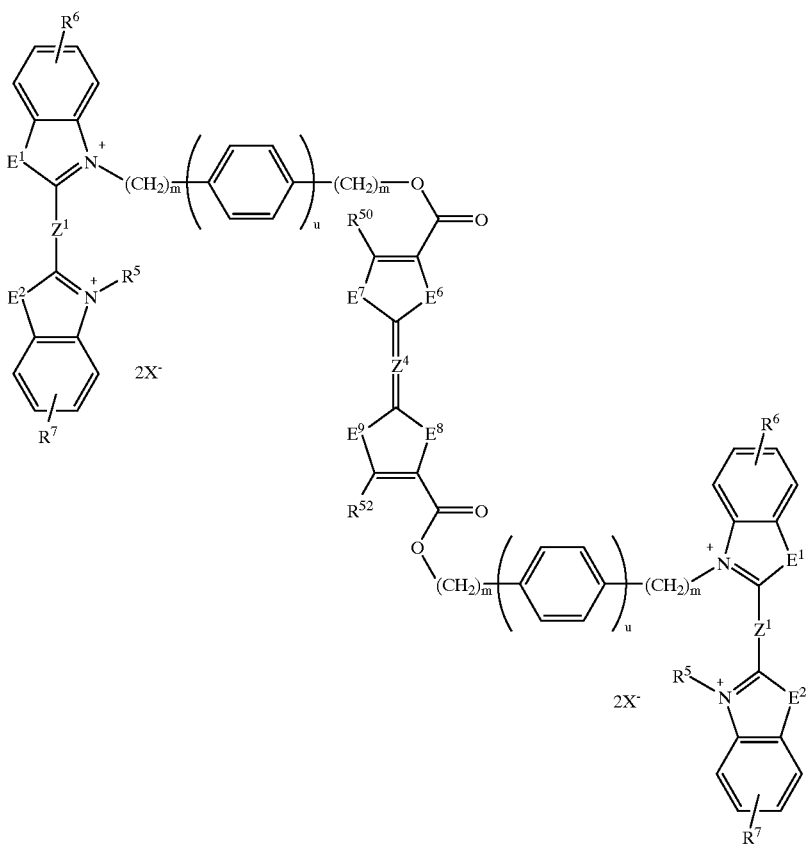
or at least one substance of the formula (Ic) corresponding to one of the formulae
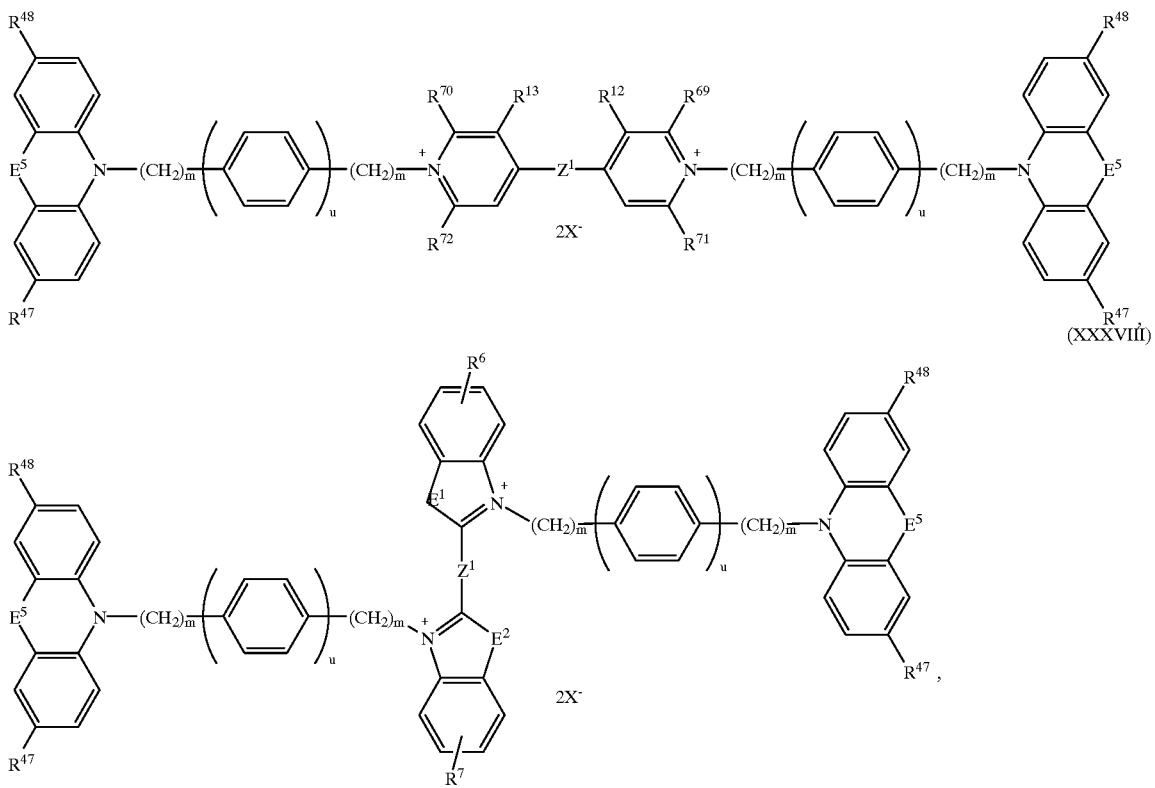

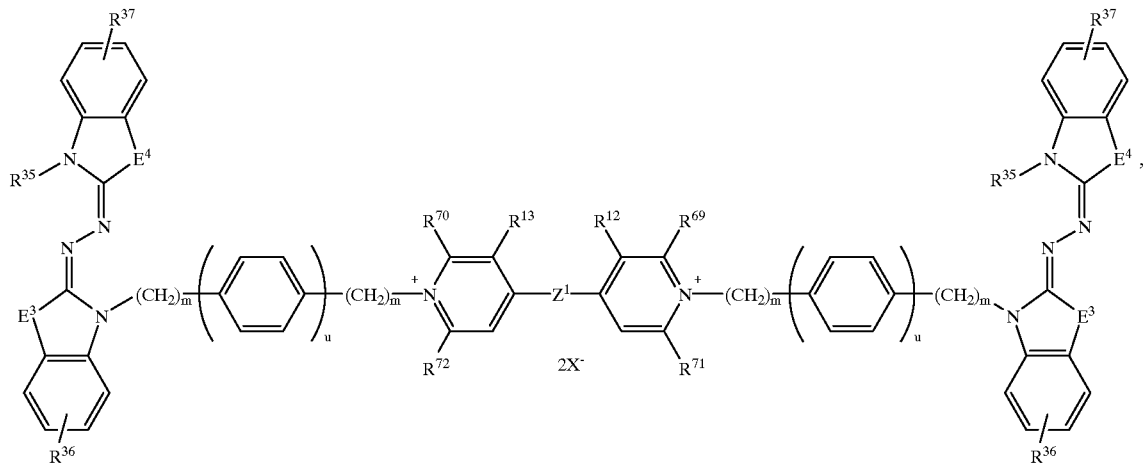
(XXXIX)
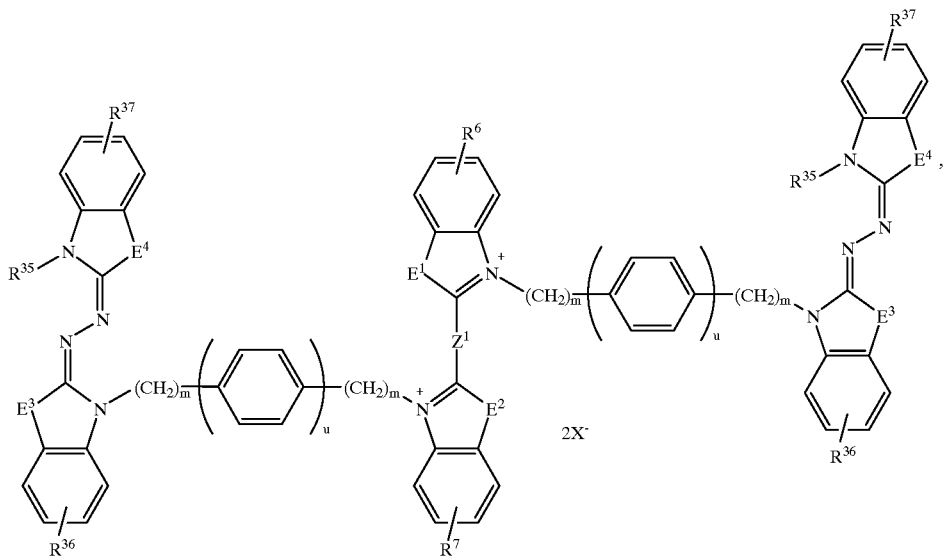
(XL)
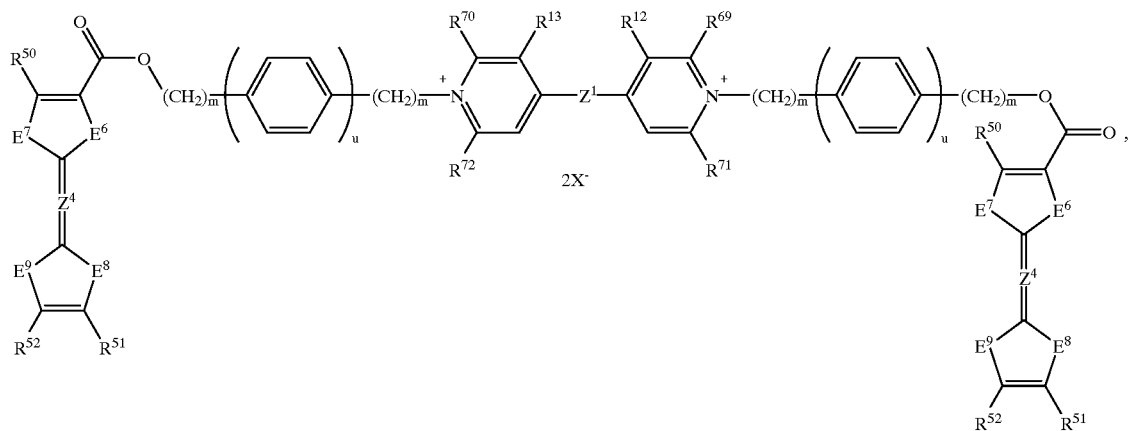
(XLI)

(XLII)

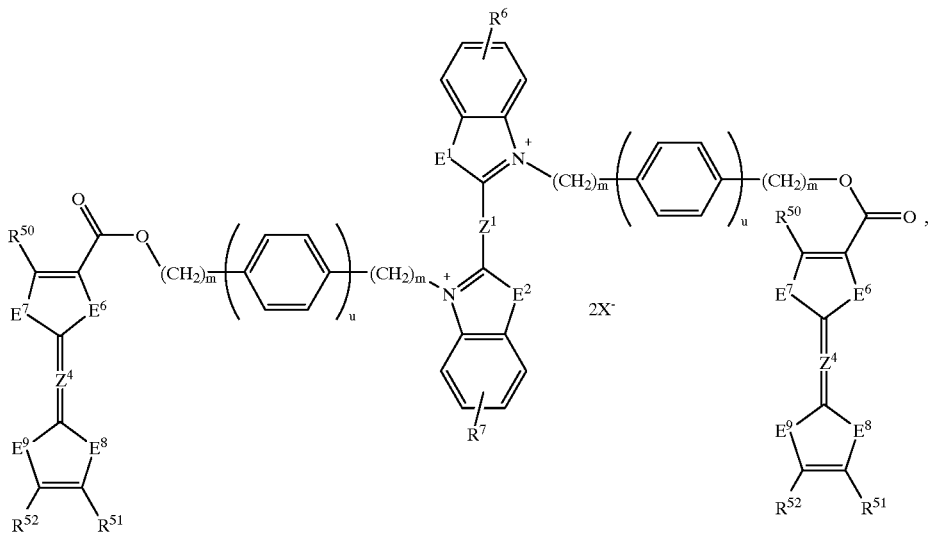

in which
- $R^3$, $R^5$, $R^{35}$ and $R^{39}$ independently of one another represent methyl, ethyl, propyl, butyl, pentyl, hexyl or benzyl,
- $R^6$, $R^7$ and $R^{36}$, $R^{37}$ in pairs are identical and represent hydrogen, methyl, methoxy, chlorine, cyano or methoxycarbonyl,
- $R^{12}$ and $R^{13}$ represent hydrogen or, if $Z^1$ denotes a direct bond, together represent a —CH=CH— bridge,
- $R^{69}$ to $R^{72}$ are identical and represent hydrogen or methyl,
- $E^1$ and $R^2$ are identical and represent O or S,
- $Z^1$ represents a direct bond or —CH=CH—,
- $R^{32}$, $R^{47}$ and $R^{48}$ represent hydrogen,
- $E^3$ to $E^5$ independently of one another represent O, S or $NR^{59}$, but $E^3$ and $E^4$ are identical,
- $R^{29}$ to $R^{31}$ and $R^{59}$ independently of one another represent methyl, ethyl, propyl, butyl, pentyl, hexyl or benzyl, where $R^{29}$ to $R^{31}$ are preferably identical,
- $R^{40}$ and $R^{41}$ are identical and represent hydrogen, methyl, ethyl, propyl, butyl or phenyl,
- $Z^3$ represents a direct bond, —CH=CH— or —N=N—,
- $R^{50}$ to $R^{52}$ independently of one another represent hydrogen, methyl, methoxy, chlorine, cyano, methoxycarbonyl, ethoxycarbonyl or phenyl, but are preferably identical,
- $E^6$ to $E^9$ are identical to one another and represent S, Se or $NR^{59}$,
- $Z^4$ represents a direct double bond or an =CH—CH= or =N—N= bridge,
- m represents an integer from 1 to 5,
- u represents 0 or 1 and
- $X^-$ represents a colourless anion which is redox-inert under the conditions.

In the abovementioned definitions of substituents alkyl radicals, including modified versions such as alkoxy or aralkyl radicals, for example, are preferably those having 1 to 12 C atoms, especially having 1 to 8 C atoms, unless indicated otherwise. They can be straight-chain or branched and can if desired carry further substituents such as, for example, $C_1$- to $C_4$-alkoxy, fluorine, chlorine, hydroxyl, cyano, $C_1$- to $C_4$-alkoxycarbonyl or COOH.

Cycloalkyl radicals are preferably those having 3 to 7 C atoms, especially 5 or 6 C atoms.

Alkenyl radicals are preferably those having 2 to 8 C atoms, especially 2 to 4 C atoms.

Aryl radicals, including those in aralkyl radicals, are preferably phenyl or naphthyl radicals, especially phenyl radicals. They can be substituted by 1 to 3 of the following radicals: $C_1$- to $C_6$-alkyl, $C_1$- to $C_6$-alkoxy, fluorine, chlorine, bromine, cyano, hydroxyl, $C_1$- to $C_6$-alkoxycarbonyl or nitro. Two adjacent radicals can also form a ring.

The electrochromic fluid of the invention preferably comprises at least one solvent.

Suitable solvents are all solvents which are redox-inert at the chosen voltages and which cannot give off electrophiles or nucleophiles or themselves react as sufficiently strong electrophiles or nucleophiles and so could react with the coloured free-radical ions. Examples are propylene carbonate, γ-butyrolactone, acetonitrile, propionitrile, glutaronitrile, methylglutaronitrile, 3,3'-oxydipropionitrile, hydroxypropionitrile, dimethylformamide, N-methylpyrrolidone, sulpholane, 3-methylsulpholane or mixtures thereof. Preference is given to propylene carbonate and to mixtures thereof with glutaronitrile or 3-methylsulpholane.

The electrochromic fluid of the invention can comprise at least one inert conductive salt. Examples of suitable inert conductive salts are lithium, sodium and tetraalkylammonium salts, especially the latter. The alkyl groups can contain between 1 and 18 C atoms and can be identical or different. Tetrabutylammonium is preferred. Suitable anions of these salts, and also suitable anions $X^\ominus$ in the formulae (I), (II), (IV) and (VII), are all redox-inert, colourless anions.

Examples are tetrafluoroborate, tetraphenylborate, cyanotriphenylborate, tetramethoxyborate, tetrapropoxyborate, tetraphenoxyborate, perchlorate, chloride, nitrate, sulphate, phosphate, methanesulphonate, ethanesulphonate, tetradecanesulihonate, pentadecanesulplionate, trifluoromethanesulphonate, perfluorobutanesulphonate, perfluorooctanesulphonate, benzenesulphonate, chlorobenzenesulphonate, toluenesulphonate, butylbenzenesulphonate, tertbutylbenzenesulphonate, dodecylbenzenesulphonate, trifluoromethylbenzenesulphonate, hexafluorophosphate, hexafluoroarsenate, hexafluorosilicate, 7,8- or 7,9-dicarbanido-undecaborate(1-) or (2-), which are optionally substituted on the B and/or C atoms by one or two methyl, ethyl, butyl or phenyl groups, dodecahydro-dicarbadodecaborate (2-) or B-methyl-C-phenyl-dodecahydro-dicarbadodecaborate(1-).

In the case of polyvalent anions, $X^-$ represents one equivalent, e.g. represents ½ $SiF_6^{2-}$.

The conductive salts are preferably employed in the range from 0 to 1 molar.

As further additives to the electrochromic fluid it is possible to employ thickeners in order to control the viscosity of the fluid. This may be important for avoiding segregation, i.e. the formation of coloured streaks or spots on prolonged operation in the switched-on state of an electrochromic device comprising the electrochromic fluid of the invention, and for controlling the rate of fade after switching off the current.

Suitable thickeners are all compounds customary for these purposes, such as polyacrylate, polymethacrylate (Luctite L®), polycarbonate and polyurethane, for example.

The electrochromic fluid can also be in gel form.

Other suitable additives for the electrochromic fluid are UV absorbers to improve the light fastness. Examples are Uvinol® 3000 (2,4-dihydroxybenzophenone, BASF), SANDUVOR® 3035 (2-hydroxy-4-n-octyloxybenzophenone, Clariant), Tinuvin® 571 (2-(2H-benzotriazol-2-yl)-6-dodecyl-4-methylphenot, Ciba), Cyasorb 24™ (2,2'-dihydroxy-4-methoxybenzophenone, American Cyanamid Company), UVINUL® 3035 (ethyl 2-cyano-3,3-diphenylacrylate, BASF), Uvinul® 3039 (2-ethylhexyl 2-cyano-3,3-diphenylacrylate, BASF), UVINUL® 3088 (2-ethylhexyl p-methoxycinnamate, BASF), and CHIMASSORB® 90 (4-methoxy-2-hydroxybenzophenone, Ciba).

The UV absorbers are employed in the range from 0.01 to 2 mol/l, preferably from 0.04 to 1 mol/l, and can also be mixed.

The electrochromic fluid of the invention comprises the substances of the formula (I), especially of the formulae (Ia) to (Id), in each case in a concentration of at least $10^{-4}$ mol/l, preferably from 0.001 to 1 mol/l. It is also possible to employ mixtures of two or more electrochromic substances of the formula (I).

The electrochromic device of the invention is constructed, for example, in the following way. In this context a distinction is made between three basic types:

Type 1: all-over electrochromic devices, for example for window panes.

Type 2: mirrored devices which can be shaded electrically, for example car mirrors.

Type 3: electrochromic display devices, for example segmented or matrix displays.

In the case of type 1, use is made of glass or plastic plates which are coated over the whole of one side with a transparent conductive coat.

This conductive coat consists, for example, of indium tin oxide (ITO), antimony- or fluorine-doped tin oxide, antimony- or aluminium-doped zinc oxide, tin oxide or conductive organic polymers such as, for example, unsubstituted or substituted polythienyls, polypyrrols, polyanilines, polyacetylene. This produces a transmissive electrochromic device which can be viewed in transmitted light.

In the case of type 2, plates are used as for type 1. In addition, one of the two plates is mirrored. This mirroring can be applied to the second, non-conductively coated side of one of the two plates. Alternatively, it may be applied to one of the two plates instead of the abovementioned conductive coating and thus fulfil simultaneously the function of the conductive coat and of the mirroring. In this case, the plate may also be opaque. For mirroring it is possible to use silver, chromium, aluminium, palladium or rhodium or else palladium on chromium or rhodium on chromium, or other known materials. In this way a reflective electrochromic device is obtained.

In the case of type 3, the mode of construction as for type 1 or 2 can be chosen. In this way a transmissive or a reflective electrochromic display device is obtained. In either case, however, at least one of the two conductive layers, or both, is or are divided into segments which are separate from one another electrically and can be contacted individually. Alternatively, it is possible for only one of the two plates to be conductively coated and divided into segments. The segments can be separated, for example, by mechanical removal of the conductive coat by means, for example, of scoring, scratching, scraping or milling, or chemically, for example by etching using, for example, a solution of $FeCl_2$ and $SnCl_2$ in hydrochloric acid. This removal of the conductive layer can be locally controlled by means of masks, for example photoresist masks. Also possible, however, is the production of electrically separate segments by means of controlled application—controlled for example by means of masks and comprising, for example, sputtering or printing—of the conductive coat. The contacting of the segments takes place, for example, by means of fine strips of conductive material, by means of which the segment is brought into electrically conducting communication with a contact at the edge of the electrochromic device. These fine contact strips consist either of the same material as the conductive coat itself and can be prepared, for example, along with said coat at the same time as it is subdivided into segments as described above. Alternatively, in order to improve the conductivity, for example, they can consist of a different material, such as fine metallic conductors made, for example, from copper or silver. A combination of metallic material and the material of the conductive coating is a further possibility. These metallic conductors may, for example, be applied, e.g. bonded, in fine wire form, or else may be printed on. All of these techniques just described are common knowledge from the production of liquid-crystal displays (LCDs).

The displays can be viewed in transmitted light or else reflectively via a mirror coating.

In the case of types 1 to 3 an adhesive of the invention, containing for example glass beads as spacers, is applied to one of the two plates (1) (see FIG. 1) on, the conductively coated side in such a way—using, for example, a syringe or an automatic metering device—as to give an adhesive bead (2), which leaves at least one filling aperture (3) open. The filling aperture/apertures may also be made on another edge of the plate (1). They may also be made on two different edges, for example opposite edges. The second plate (4) with the side of its conductive coating is then placed onto the bead of adhesive and pressed on. The spacers establish the desired coat distance. This cell is then cured in accordance with the type of adhesive chosen, as described above. This curing can take place thermally, photochemically or thermally with photochemical initiation.

Under an inert gas atmosphere, for example nitrogen or argon, the cell is filled via the filling apertures (3) with the electrochromic fluid of the invention, which itself is free from oxygen and has either been degassed or charged with the inert gas. Filling can take place, for example, with a pipette or a syringe, with the displaced gas volume escaping via a second aperture (3). Filling can also be carried out in such a way that the cell and the electrochromic device are introduced into all evacuable vessel. The vessel is evacuated. The cell with its filling aperture (3) (in the case of two or more apertures, all must lie on one edge) downwards is dipped into the electrochromic fluid. The vessel is then charged with inert gas, with the electrochromic fluid rising in the cell until finally it has filled it completely except perhaps for a small gas bubble.

Irrespective of the method of filling, the filled cell is cleaned with a paper cloth, for example, under inert gas at the filling apertures (3) to remove any adhering electrochromic fluid. Then the aperture/s (3) is/are sealed with one of the adhesives of the invention intended for cell sealing. The adhesive is applied to the aperture (3) and possibly to the area immediately around it by means, for example, of a syringe or with an automatic metering device, and may also be forced into the aperture (3). This can be performed such that a small gas bubble is located in the filling aperture between the electrochromic fluid and the adhesive, or else in such a way that such a bubble is avoided. Subsequently, the adhesive is cured as described above for these adhesives.

Depending on the type of adhesive it can be carried out with light alone or else thermally with photoinitiation. "Thermally" here denotes a non-photochemical cure which is intended to take place preferably at room temperature or at the temperature which prevails in the course of filling and of adhesive application. Heating in the course of the curing process, even with pure photocuring, should be avoided, since heating may cause the cell contents to expand, and hence the not yet fully cured sealing adhesive may be lifted and a secure seal hence prevented The distance between the two plates (1) and (4) is in general from 0.005 to 2 mm, preferably from 0.01 to 0.5 mm.

Specific embodiments of the above-mentioned types 1 to 3 can be, for example, the following, which are likewise provided by the invention:

Type 1: from the light protection/light filter sector: window panes for, for instance, buildings, road vehicles, aircraft, trains, ships, roof glazing, car sunroofs, glazing of glasshouses and conservatories, light filters of whatever kind; from the safety/secrecy sector: separating sheets for, for example, room dividers in, for example, offices, road vehicles, aircraft, trains, see-through protective screens at, for example, bank counters, door glazing, visors for, for example, motorbike or pilots' helmets; and from the design sector: glass of baking ovens, microwave ovens, other domestic appliances, furniture.

Type 2: mirrors of whatever type, for example rearview mirrors for, for example, road vehicles, trains, especially planar, spherical and aspherical mirrors and combinations thereof, e.g. spherical/aspherical, mirror glazing in furniture.

Type 3: display devices of whatever type, for example segmented or matrix displays, for example for clocks, computers, electrical appliances, electronic appliances such as radios, amplifiers, televisions, CD players, etc., destination displays in buses and trains, departure displays in railways stations and airports, flat screens, all applications specified under types 1 and 2 which include at least one switchable, static or variable display device, for example separating screens which contain displays such as, for example "Do not disturb", "Counter not occupied", for example car mirrors which may contain displays of any desired kind, such as displays of the temperature, faults in the vehicle (e.g. oil temperature, open doors), time, direction, etc.

EXAMPLES

Example 1

An ITO coated glass plate (1) had applied atop it in accordance with FIG. 1 a ring (2) comprising a mixture of a two-component epoxy adhesive, KÖRAPOX® 733 from Kömmerling, Pirmasens (component A: epoxide of the formula (CIII) with m statistically=2, rendered thixotropic with Aerosil, viscosity=20,000 mPas; component B: polyaminoimidazoline, tetraethylenepentamine, triethylenetetramine, benzyl alcohol, α,α'-diamino-m-xylene, phenol, viscosity 3500 mPas; A:B=2:1 parts by weight) and 3% of glass beads of diameter 200 mm as spacers, and two filling apertures (3) were made in this ring. A second ITO-coated glass plate (4) was placed with its coated side onto this bead of adhesive. After 5 minutes at room temperature the adhesive was cured at 150° C. for 20 minutes. A glove box and pipette were used to introduce, under nitrogen atmosphere, a solution which was 0.02 molar in terms of the electrochromic compound of the formula (CVI)

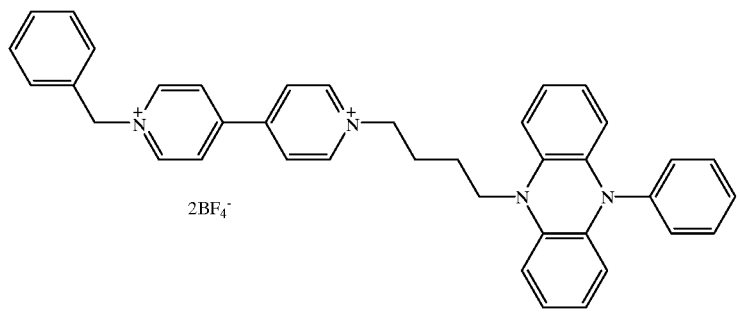

2BF$_4^-$ and 0.4 molar in terms of the UV absorber of the formula

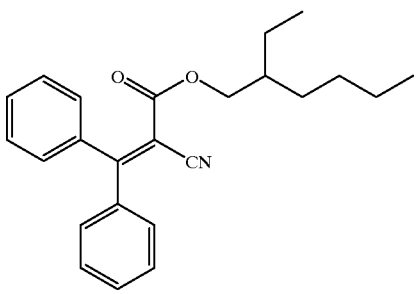

(CVII)

in anhydrous, oxygen-free propylene carbonate. The filling apertures (3) were sealed with a mixture comprising photochemically initiatable epoxy adhesive DELO-Katiobond® 4594, DELO Industrieklebstoffe, Landsberg, thickened with 5% silica gel-Aerosil or with the DELO-Katiobond® VE 4218, DELO-Industrieklebstoffe, Landsberg, which has already been rendered thixotropic. The bonds were subsequently exposed to daylight for 10 minutes in the vicinity of a window and were cured overnight at room temperature.

Alternatively, this exposure of the DELO adhesive could also be carried out with a photographic flash lamp or by exposure for 1 minute with the lamp DELOLUX® 03, DELO Industrieklebstoffe, Landsberg, at a distance of 30 cm. In any case, curing took place overnight at room temperature.

The solution in the cell was virtually colourless. On applying a voltage of 0.9 V the solution turned an intense greenish-blue colour with maxima at 466 and 607 nm. After switching off the current supply and shot circuiting, the contents lost their colour again within 10 s.

No change was found after more than 100,000 such cycles.

Example 2

The procedure of Example 1 was repeated except that instead of the 2-component epoxy adhesive the cell was constructed with a mixture of the photochemically initiatable epoxy adhesive DELO-Katiobond® 4594 or DELO-Katiobond® VE 4218, DELO Industrieklebstoffe, Landsberg, and 3% of glass beads of diameter 200 mm. Curing took place by 10 minutes of exposure to daylight in the vicinity of a window and then for 20 minutes at 105° C. without exposure. Alternatively, this exposure can be performed with a photographic flash lamp or by 1 minute of exposure to the lamp DELOLUX® 03, DELO Industrieklebstoffe, Landsberg, at a distance of 30 cm. After the filling of the cell as described in Example 1 the filling apertures (3) were sealed with a mixture comprising 3 parts of trimethylolpropane triacrylate, 5 parts of polyethylene glycol 400 diacrylate and 0.5 per cent by weight of the UV initiator Darocur® 1173, E. Merck, Darmstadt. The adhesive was cured by 1 minute of exposure to the lamp DELOLUX® 03, DELO Industrieklebstoffe, Landsberg, at a distance of 30 cm.

The properties of the cell were as described under Example 1.

Example 3

The procedure described in Example 1 was repeated except that the filling apertures (3) were sealed with the photochemically curable acrylate adhesive DELO-Photobond® 4468 (not rendered thixotropic, viscosity=7000 mPas), DELO Industrieklebstoffe, Landsberg. The bond was subsequently exposed for 1 minute under a stream of nitrogen to the lamp DELOLUX® 03, DELO Industrieklebstoffe, Landsberg, at a distance of 8 cm and cured overnight at room temperature in the glove box.

The properties of the cell were as desribed under Example 1.

Example 4

The procedure described in Example 3 was repeated except that the filling apertures (3) were sealed with the photochemically curable acrylate adhesive DELO-Photobond® 4497 (4468 which has been rendered thixotropic, viscosity=30,000 mPas), DELO Industrieklebstoffe, Landsberg. The bond was subsequently exposed for 1 minute under a stream of nitrogen to the lamp DELOLUX® 03, DELO Industrieklebstoffe, Landsberg, at a distance of 8 cm and cured overnight at room temperature in the glove box.

The properties of the cell were as desribed under Example 1.

Example 5

Figure 2:
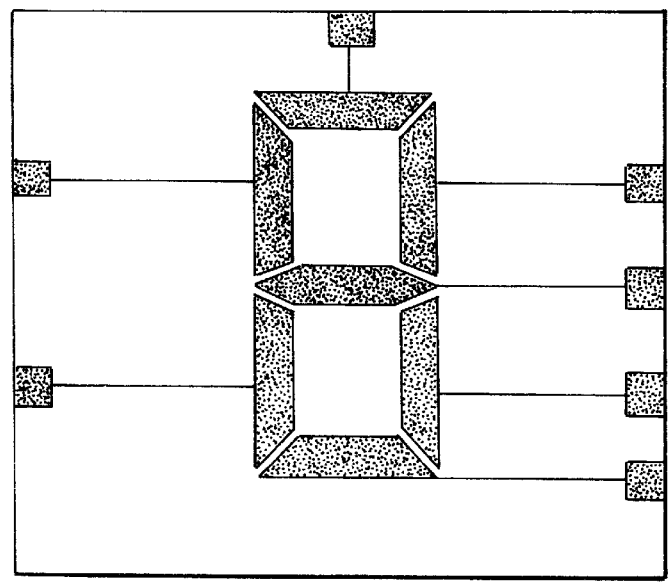
FIG. 2 represents a glass plate having segments in a transparent surround in which each segment is conductive and has an electrical connection.

An ITO-coated glass plate was sprayed on the coated side with a customary commercial photoresist, e.g. Positiv 20 from Kontakt Chemie, Iffezheim, and was dried in the dark at from 50 to 70° C. for 1 h. The resist coat was then covered with a film which in accordance with FIG. 2 contained black segments in a transparent surround. This film was printed using a laser printer in accordance with a computer-produced template. The photoresist coat was then exposed through this film with UV light (from a mercury lamp, e.g. HBO 200W/2 from Osram or from a high-pressure xenon lamp XBO 75W/2 from Osram) for from 1 to 5 minutes. The film was removed and the resist coat was treated in a sodium hydroxide bath (7 g of sodium hydroxide per litre of water) so that the unexposed areas were rinsed away. The glass plate thus prepared was then placed in a bath comprising 67 g of $FeCl_2 \times 4\ H_2O$, 6 g of $SnCl_2 \times 2\ H_2O$, 104 ml of water and 113 ml of 37 per cent strength by weight hydrochloric acid, as a result of which the ITO coat was removed at the resist-free, formerly exposed areas. The remaining resist coat was removed with acetone. This gave a glass plate (11) which bore segments (14), conductive connections (13) and contacts (12).

Figure 3:
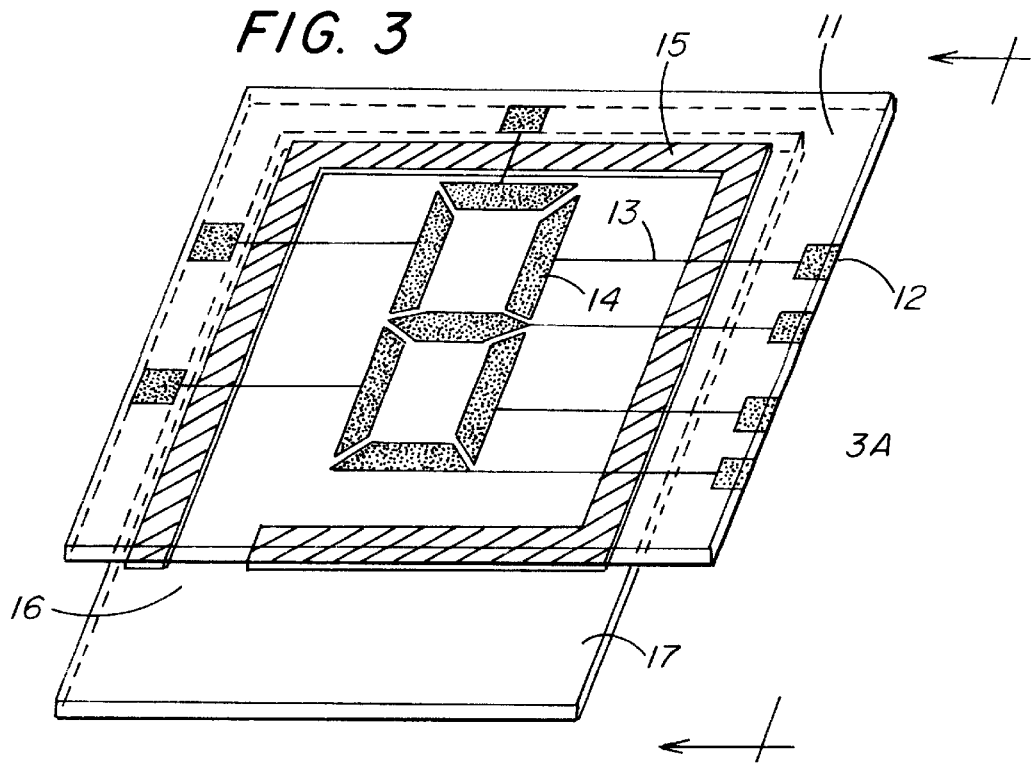
FIG. 3 represents an embodiment of the invention using a glass plate configured as in FIG. 2.
Figure 3A:
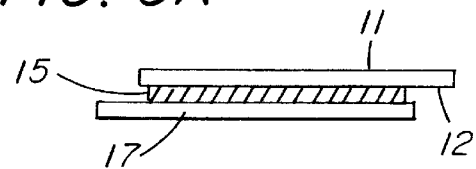
FIG. 3a is an elevation of the right side of the embodiment represented in FIG. 3.

A mixture comprising the photochemically initiatable epoxy adhesive DELO-Katiobond® 4594 or DELO-Katiobond® VE 4218, DELO Industrieklebstoffe, Landsberg, and 3% of glass beads of diameter 50 mm was applied in a ring (15) to the ITO-coated side of the second glass plate (17), with an aperture (16) being made. Then the etched glass plate (11) produced as described above was placed on the bead of adhesive in such a way that the ITO coats of the two plates (11) and (17) were facing one another and the resulting geometry was as shown in FIG. 3. The adhesive was cured by exposure to daylight in the vicinity of a window for 10 minutes and then without exposure at 105° C. for 20 minutes.

Under a nitrogen or argon atmosphere, the cell was then placed with the aperture (16) downwards vertically into a dish containing a solution which was 0.06 molar in terms of the electrochromic compound of the formula

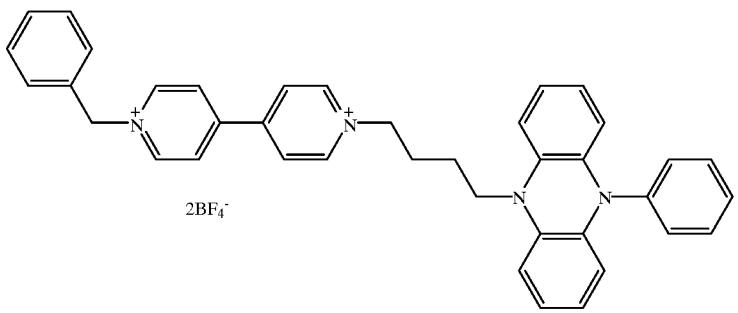

(CVI)

in anhydrous, oxygen-free propylene carbonate in such a way that the aperture (16) was below the level of the fluid. The dish comprising the cell was placed in a desiccator and evacuated at 0.05 mbar. The desiccator was then carefully charged with nitrogen or argon. The electrochromic solution rose into the cell and filled the entire volume except for a small bubble. The cell was removed from the solution, wiped off with a paper cloth, for example, at the aperture (16) under nitrogen or argon atmosphere and then sealed with the photochemically initiatable epoxy adhesive DELO-Katiobond® 4594, DELO Industrieklebstoffe, Landsberg, thickened with 2% of silica gel-Aerosil. The bond was subsequently exposed to daylight in the vicinity of a window for 10 minutes and cured at room temperature overnight.

Application of a voltage of 0.8 V to the contacts (12) of the segments as cathode and to the unetched second plate (17) as anode rapidly formed a deep greenish blue image of the contacted segments. In this way it was possible to produce all numbers and letters which can be represented by means of 7 segments in a deep greenish blue on a pale yellow background. When the voltage was switched off and the contacts short-circuited, the image rapidly disappeared again.

Example 6 (Comparative Example)

The procedure of Example 1 was repeated except that in the course of constructing the cell the adhesive KÖRAPOX® 733 was cured not at 150° C. but instead at room temperature overnight.

When the cell was connected with 0.9 V, the solution took on an intense greenish blue colouration. After switching off the voltage and short-circuiting the cell, this coloration disappeared again. Over the course of several days, with the cell just left to stand or else in operation under voltage, there was gradual development of a blue residual colouration which could be observed in the voltage-free, short-circuited state.

Example 7 (Comparative Example)

The procedure of Example 1 was repeated except that the cell was sealed using the two-component epoxy adhesive KÖRAPOX® 733 from Kömmerling, Pirmasens (for composition see Example 1). Curing took place overnight at room temperature. In the course of this time, in the vicinity of the filling apertures (3), the electrochromic solution turned a deep blue colour, which gradually distributed itself throughout the entire cell and no longer disappeared.

When the cell was connected with 0.9 V, the solution turned an intense greenish-blue colour. After switching off the voltage and short-circuiting the cell this colouration disappeared again, but the original blue base colouration remained. This residual blue colouration increased gradually over the course of several days when the cell was just left standing or else on operation under voltage.

Example 8 (Temperature Test)

The cells of Examples 1 and 4 and 6 and 7 were stored in a heating cabinet at 105° C. for 1 to 3 h. The results are given in the table below:

|  | 1 h | | 3 h | |
|---|---|---|---|---|
| Cell | Colour | Tightness | Colour | Tightness |
| Example 1 | colourless | tight | colourless | tight |
| Example 2 | colourless | tight | colourless | tight |
| Example 3 | colourless | tight | colourless | tight |
| Example 4 | colourless | tight | colourless | tight |
| Example 6 | blue | leaked | — | — |
| Example 7 | blue | tight | blue | leaked |

Example 9 a) 9.2 g of phenazine were suspended in 60 ml of anhydrous tetrahydroluran under a nitrogen atmosphere. 30.8 ml of 20% strength by weight phenyllithium solution in 7:3 cyclohexane/diethyl ether were added dropwise over the course of 15 minutes, during which the temperature was held at max. 35° C. The solution was subsequently stirred at room temperature for 30 minutes.

At 15° C., 30.2 ml of 1,4-dibromobutane were added in one portion. In the course of this addition the temperature rose to 38° C. After 6 h at room temperature, 200 ml of water were added and the pH was adjusted to 7.0. The organic phase was separated off, washed three times with 100 ml of water each time and concentrated in vacuo. Finally, excess 1,4-dibromobutane was distilled off under a pressure of 0.2 mbar. The oily residue was dissolved hot in 400 ml of ethanol. The product which precipitated on cooling was filtered off with suction, washed with ethanol and hexane and dried. This gave 8.0 g (41% of theory) of a pale yellow powder of the 9,10-dihydrophenazine of the formula

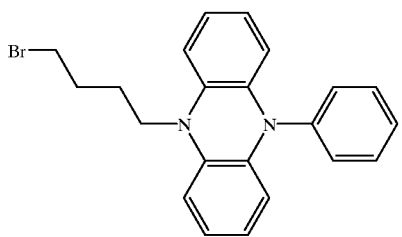

(CVIII)

b) 7.5 g of the 9,10-dihydrophenazine of the formula (CVIII) from a) and 6.1 g of 4,4'-bipyridyl were stirred in 100 ml of acetonitrile at 70° C. under a nitrogen atmosphere for 24 h. After cooling, the mixture was filtered with suction and the solid product washed with 50 ml of acetone. Drying gave 6.3 g (60% of theory) of the salt of the formula

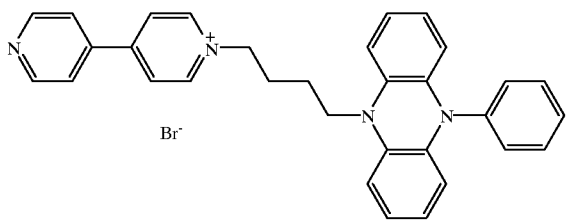

(CIX)

c) 6.1 g of the salt obtained in b) were stirred into 70 ml of N-methyl-2-pyrrolidone together with 2.7 ml of benzyl bromide at 70° C. under a nitrogen atmosphere for 7 h. After cooling, the mixture was diluted with 150 ml of toluene and the precipitated product was filtered off with suction. It was washed thoroughly with 150 ml of toluene and 500 ml of hexane and dried. This gave 5.5 g (69% of theory) of the dipyridinium salt of the formula

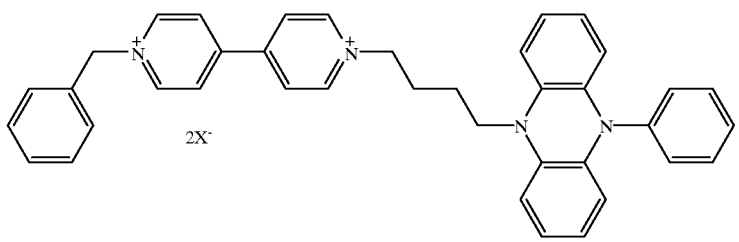

where $X^-=Br^-$.

d) 4.0 g of this product from c) were dissolved in 100 ml of methanol at 65° C. under a nitrogen atmosphere. 7.4 g of tetrabutylammonium tetrafluoroborate were sprinkled in over the course of 5 minutes. Precipitation occurred. After 5 minutes at 65° C. the mixture was cooled and the precipitate was filtered off with suction, washed with 200 ml of methanol and 50 ml of hexane and dried in vacuo. This gave 3.4 g (83% of theory) of a pale beige powder of the formula (CX) with $X^-=BF_4^-$ (=CVI).

In an electrocliromic device according to Examples 1 to 5 a greenish blue colouration was obtained with $\lambda_{max}$=466 and 607 mm.

What is claimed is:

1. An electrochromic device comprising a pair of transparently and conductively coated glass or plastic plates, one of which plates is optionally mirrored and the conductive layer of one or both of which plates is optionally subdivided into separate individually electrically contacted segments, wherein
   (1) the plates are joined together on the sides of their conductive coating by an adhesive bead into which spacers are optionally embedded, wherein the adhesive used for the adhesive bead is a thermally or photochemically curing epoxy adhesive or an epoxy adhesive that cures thermally after photochemical initiation,
   (2) the volume formed by the two plates and the adhesive bead is filled with an electrochromic fluid through one or more apertures, and
   (3) the filling aperture or apertures required for introduction of the electrochromic fluid are sealed with an adhesive after filling has taken place, wherein the adhesive used for sealing is a photochemically curing acrylate adhesive or an epoxy adhesive that cures photochemically or following photochemical initiation at room temperature.

2. An electrochromic device according to claim 1 wherein the epoxy adhesive is a one-component adhesive.

3. An electrochromic device according to claim 1 wherein the epoxy adhesive comprises an epoxide compound, an aminic compound, and a capped Lewis acid or a capped Brønsted acid.

4. An electrochromic device according to claim 3 wherein
   (1) the epoxide compound comprises an epoxide of the formula (C)

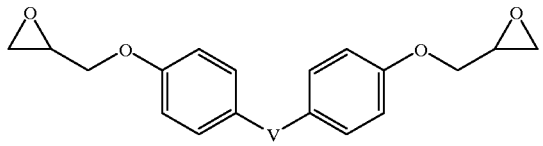

(C)

wherein V represents a bridge that optionally carries one or more epoxy groups, (2) the aminic compound is a primary or secondary aliphatic, cycloaliphatic, aromatic, araliphatic, or heterocyclic amine that is at least bifunctional, and (3) the capped Lewis acid is a non-metal halide in capped form and the capped Brønsted acid compound is a strong protic acid in capped form derived from a non-metal halide.

5. An electrochromic device according to claim 1 wherein the epoxy adhesive contains spacers.

6. An electrochromic device according to claim 1 wherein the epoxy adhesive contains spacers having a diameter of from 0.005 to 2 mm and selected from the group consisting of glass beads, plastic beads, sands, and silicon carbide beads.

7. An electrochromic device according to claim 1 wherein the acrylate adhesive comprises (1) a compound of the formula (CI)

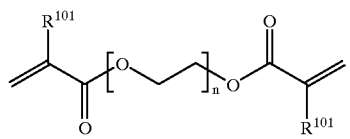
(CI)

wherein

| | |
|---|---|
| n | represents an integer from 0 to 20, and |
| $R^{101}$ | represents hydrogen or methyl, or |

(2) a compound of the formula (CII)

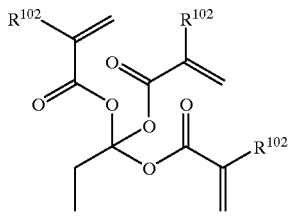
(CII)

wherein
$R^{102}$ represents hydrogen or methyl.

8. An electrochromic device according to claim 1 wherein the viscosity of the adhesives is greater than 10,000 mPa·s.

9. An electrochromic device according to claim 1 wherein the electrochromic fluid comprises a weakly colored or colorless combination of at least one oxidizable substance $RED_1$ that releases electrons at an anode and in so doing undergoes transition into a substance $OX_1$ and at least one reducible substance $OX_2$ that accepts electrons at a cathode and in so doing undergoes transition into a substance $RED_2$, with the proviso that at least one of $OX_1$ or $RED_2$ is accompanied by an increase in the absorbance in the visible region of the spectrum and thereby becomes colored and the combination is restored to the weakly colored or colorless form after charge equalization.

10. An electrochromic device according to claim 9 wherein at least one of the substances $RED_1$ is linked covalently to at least one of the substances $OX_2$ by a bridge.

11. A process for preparing an electrochromic device according to claim 1 comprising (a) applying to the conductively coated side of a conductively coated glass or plastic plate an adhesive comprising a thermally or photochemically curing epoxy adhesive or an epoxy adhesive that cures thermally after photochemical initiation and containing spacers to the conductively coated side of the glass or plastic plate to form an adhesive bead having at least one open filling aperture, (b) pressing the conductively coated side of a second plate onto the adhesive bead, (c) subjecting the adhesive applied in step (a) to thermal or photochemical curing or thermal curing with photochemical initiation, (d) filling the volume formed by the two plates and the adhesive bead through at least one open filling aperture, under an inert gas atmosphere, with an electrochromic fluid that is itself free from oxygen and has either been degassed or charged with the inert gas, (e) sealing at least one open filling aperture with an adhesive comprising a photochemically curing acrylate adhesive or an epoxy adhesive that cures photochemically or following photochemical initiation at room temperature, and (f) curing the adhesive used in step (e) with light alone or at room temperature with initiation by light.

12. A window pane, separating screen, or see-through protective screen comprising an electrochromic device according to claim 1.

13. A mirror comprising an electrochromic device according to claim 1.

14. A segmented or matrix display comprising an electrochromic device according to claim 1 that is subdivided into separate segments.

* * * * *